United States Patent [19]
Toda

[11] Patent Number: 6,005,327
[45] Date of Patent: Dec. 21, 1999

[54] ULTRASONIC TOUCH-POSITION SENSING DEVICE

[76] Inventor: Kohji Toda, 1-49-18 Futaba, Yokosuka 239, Japan

[21] Appl. No.: 09/023,195

[22] Filed: Feb. 13, 1998

[51] Int. Cl.$^6$ .................................................. H01L 41/08
[52] U.S. Cl. .................................. 310/313 R; 310/313 D
[58] Field of Search ........................... 310/313 R, 313 B, 310/313 C, 313 D; 333/193–196, 150–155

[56] References Cited

U.S. PATENT DOCUMENTS

| | | | |
|---|---|---|---|
| 5,679,998 | 10/1997 | Toda | 310/313 R |
| 5,723,934 | 3/1998 | Toda | 310/313 R |
| 5,767,604 | 6/1998 | Toda | 310/313 R |
| 5,767,608 | 6/1998 | Toda | 310/313 R |
| 5,771,206 | 6/1998 | Toda | 310/313 R |
| 5,838,088 | 11/1998 | Toda | 310/313 R |
| 5,850,118 | 12/1998 | Toda | 310/313 R |
| 5,886,452 | 3/1999 | Toda | 310/313 R |

Primary Examiner—Mark O. Budd

[57] ABSTRACT

An ultrasonic touch-position sensing device comprises a nonpiezoelectric plate, two ultrasonic transducing units mounted on an upper- or a lower end surface of the nonpiezoelectric plate, and a signal controller connected with the ultrasonic transducing units. Each ultrasonic transducing unit consists of a first- and a second piezoelectric substrates, at least an input interdigital transducer and at least an output interdigital transducer. The output interdigital transducer has at least a finger-overlap zone $R_i$ (i=1). The finger-overlap zone $R_i$ comprises zones $R_{ia}$, $R_{ib}$ and $R_{im}$. The finger direction of the zones $R_{ia}$ and $R_{ib}$ runs parallel with that of the input interdigital transducer. The finger direction of the zone $R_{im}$ is slanting to that of the input interdigital transducer. When an electric signal is applied to the input interdigital transducer, an ultrasound is excited in the bilayer zone $B_T$ composed of the first piezoelectric substrate and the nonpiezoelectric plate, and transmitted to the bilayer zone $B_R$, composed of the second piezoelectric substrate and the nonpiezoelectric plate, through the monolayer zone between the bilayer zones $B_T$ and $B_R$. The ultrasound is transduced to electric signals $E_{ia}$ and $E_{ib}$ (i=1, 2, . . . , N) at the zones $R_{ia}$ and $R_{ib}$, respectively.

20 Claims, 24 Drawing Sheets

ULTRASONIC TOUCH-POSITION SENSING DEVICE

BACKGROUND OF THE INVENTION

1. Field of the Invention

The present invention relates to an ultrasonic device for sensing a touch-position on an upper- or a lower end surface of a nonpiezoelectric plate having two ultrasonic transducing units.

2. Description of the Prior Art

An ultrasonic form of conventional touch panels has a nonpiezoelectric plate under acoustic vibration, which is decreased or disappeared when touching on the nonpiezoelectric plate. Conventional methods for exciting an acoustic vibration on a nonpiezoelectric plate generally include a wedge-shaped transducer with a bulk wave vibrator for vibrating a nonpiezoelectric plate indirectly, or a piezoelectric thin film transducer for vibrating a nonpiezoelectric plate directly. The wedge-shaped transducer is mainly used for a non-destructive evaluation by ultrasound under a comparative low frequency operation alone because of the difficulty on manufacturing accuracy of the wedge angle and so on. The piezoelectric thin film transducer consists of a nonpiezoelectric plate, a piezoelectric thin film mounted on the nonpiezoelectric plate and made from ZnO and others, and interdigital transducers exciting the acoustic vibration on the nonpiezoelectric plate. Because of various transmission characteristics of the interdigital transducers with various structures, the piezoelectric thin film transducer is used as a high frequency device, however has operation frequencies limited to the UHF and VHF bands, and has some problems on manufacturing and mass production. In addition, conventional-type transducers make use of decreasing or disappearance of output electric signal in accordance with decreasing or disappearance of an acoustic wave on the nonpiezoelectric plate by touching thereon, causing a high voltage operation with a high power consumption, and a large-scale circuit with a complicated structure.

Thus, it is difficult for conventional touch panels to realize a quick response-time, a low voltage operation and a low power consumption, and a small-sized circuit with a simple structure. Moreover, there are some problems on manufacturing, mass production and operation frequencies.

SUMMARY OF THE INVENTION

An object of the present invention is to provide an ultrasonic touch-position sensing device capable of specifying a touch-position on an upper- or a lower end surface of a nonpiezoelectric plate with a high sensitivity and a quick response time.

Another object of the present invention is to provide an ultrasonic touch-position sensing deviice excellent in manufacturing and mass-production.

A still other object of the present invention is to provide an ultrasonic touch-position sensing device operating under low power consumption with low voltage.

A still further object of the present invention is to provide an ultrasonic touch-position sensing device having a small-sized circuit with a simple structure which is very light in weight.

According to one aspect of the present invention there is provided an ultrasonic touch-position sensing device comprising a nonpiezoelectric plate having an upper- and a lower end surfaces running perpendicular to the direction of the thickness h thereof, two ultrasonic transducing units mounted on the upper- or lower end surface of the nonpiezoelectric plate, and a signal controller connected with the ultrasonic transducing units. Each of the ultrasonic transducing units consists of a first piezoelectric substrate having an upper- and a lower end surfaces running perpendicular to the direction of the thickness d thereof, a second piezoelectric substrate having an upper- and a lower end surfaces running perpendicular to the direction of the thickness d thereof, at least an input interdigital transducer formed on the upper- or lower end surface of the first piezoelectric substrate arid having an interdigital periodicity P and an overlap length L, and at least an output interdigital transducer opposed to the input interdigital transducer and placed on the upper- or lower end surface of the second piezoelectric substrate. The input interdigital transducer has an interdigital periodicity P and an overlap length L. The output interdigital transducer has a finger-overlap zone $R_i$ (i=1), or has N finger-overlap zones $R_i$ (i=1, 2, ..., N) and N−1 finger-overlap zones $Q_i$ {i=1, 2, ..., (N−1)} between two finger-overlap zones $R_i$ and $R_{(i+1)}$. Each finger-overlap zone $R_i$ comprises a first zone $R_{ia}$, a second zone $R_{ib}$, and a third zone $R_{im}$ between the zones $R_{ia}$ and $R_{ib}$. The finger direction of the zones $R_{ia}$ and $R_{ib}$ runs parallel with that of the input interdigital transducer. An interdigital periodicity of the zones $R_{ia}$ and $R_{ib}$ is equal to the interdigital periodicity P. The finger direction of the zone $R_{im}$ is slanting to that of the input interdigital transducer by an angle α. An interdigital periodicity $P_{RN}$ along the vertical direction to the finger direction of the zone $R_{im}$ is equal to the product of the interdigital periodicity P and cos α, The zone $R_{im}$ has a first overlap length $L_{RP}$ along the finger direction thereof and a second overlap length $L_{RN}$ along the finger direction of the input interdigital transducer. The overlap length $L_{RP}$ is equal to the product of the overlap length $L_{RN}$ and sec α as well as the product of half the interdigital periodicity P and cosec α. The finger direction of the finger-overlap zone $Q_i$ is slanting to that of the input interdigital transducer by an angle ±β. An interdigital periodicity $P_{QN}$ along the vertical direction to the finger direction of the finger-overlap zone $Q_i$ is equal to the product of the interdigital periodicity P and cos β. The finger-overlap zone $Q_i$ has a first overlap length $L_{QP}$ along the finger direction thereof and a second overlap length $L_{QN}$ along the finger direction of the input interdigital transducer. The overlap length $L_{QP}$ is equal to the product of the overlap length $L_{QN}$ and sec β. The overlap length $L_{QP}$ is also equal to the product of cosec β and the interdigital periodicity P divided by twice the number N of the finger-overlap zones $R_i$. For example, if N=2, the overlap length $L_{QP}$ is not only equal to the product of the overlap length $L_{QN}$ and sec β, but also equal to the product of P/4 and cosec β. A part, adjacent to the first piezoelectric substrate, or the nonpiezoelectric plate, and the first piezoelectric substrate form a bilayer zone $B_T$. A part, adjacent to the second piezoelectric substrate, of the nonpiezoelectric plate, and the second piezoelectric substrate form a bilayer zone $B_R$. A remaining part, between the bilayer zones $B_T$ and $B_R$, of the nonpiezoelectric plate forms a monolayer zone.

When operating the ultrasonic touch-position sensing device, an electric signal with a frequency approximately corresponding to the interdigital periodicity P is applied to the input interdigital transducer. In this time, an elastic wave of the $S_o$ mode and the higher order modes is excited in the bilayer zone $B_T$, and transmitted to the bilayer zone $B_R$ through the monolayer zone. The elastic wave, having the wavelength approximately equal to the interdigital period icity P, is transduced to electric signals $E_{ia}$ and $E_{ib}$ (i=1, 2, ..., N), at the zones $R_{ia}$ and $R_{ib}$, respectively. The sum of the electric signals $E_{ia}$ and $E_{ib}$ is zero, because that the overlap length $L_{RP}$ is equal to the product of the overlap length $L_{RN}$ and sec $\alpha$ as well as the product of P/2 and cosec $\alpha$. The input- and output interdigital transducers form N pairs of ultrasound propagation lanes $Z_{ia}$ and $Z_{ib}$ (i=1, 2, ..., N), in the monolayer zone, corresponding to the zones $R_{ia}$ and $R_{ib}$, respectively. The ultrasound propagation lanes $Z_{ia}$ and $Z_{ib}$ correspond to positions $F_{ia}$ and $F_{ib}$ (i=1, 2, ..., N) on an upper- or a lower end surface of the monolayer zone, respectively. If touching with a finger or others on a position $F_{xa}$, an ultrasound on an ultrasound propagation lane $Z_{xa}$ attenuates, and an electric signal $E_{xb}$ corresponding to an ultrasound propagation lane $Z_{xb}$ is deLivered at the output interdigital transducer. In the same way, if touching an a position $F_{xb}$, an ultrasound on the ultrasound propagation lane $Z_{xb}$ attenuates, and an electric signal $E_{xa}$ corresponding to the ultrasound propagation lane $Z_{xa}$ is delivered at the output interdigital transducer, the positions $F_{xa}$ and $F_{xb}$ making a pair. The signal controller senses a touch on the position $F_{xa}$ or $F_{xb}$ by detecting the electric signal $E_{xb}$ or $E_{xa}$ respectively. The touched position $F_{xa}$ or $F_{xb}$ with respect to one of the ultrasonic transducing units and that with respect to the other ultrasonic transducing unit are specified at the same time. In addition, the ultrasound propagation lanes $Z_{xa}$ and $Z_{xb}$ of one of the ultrasonic transducing units are vertical to those of the other ultrasonic transducing unit.

According to another aspect of the present invention there is provided an ultrasonic touch-position sensing device including two ultrasonic transducing units, each thereof consisting of at least an input interdigital transducer and at least an output interdigital transducer. The input interdigital transducer has N finger-overlap zones $A_i$ (i=1, 2, ..., N) and N-1 finger-overlap zones $B_i$ {i=1, 2, ..., (N-1)} between two finger-overlap zones $A_i$ and $A_{(i+1)}$. The output interdigital transducer has N+1 finger-overlap zones $C_i$ {i=1, 2, ..., (N+1)} and N finger-overlap zones $D_i$ (i=1, 2, ..., N) between two finger-overlap zones $C_i$ and $C_{(i+1)}$. The finger direction of the finger-overlap zones $A_i$ runs parallel with that of the finger-overlap zones $C_i$. The finger direction of the finger-overlap zones $B_i$ is slanting to that of the finger-overlap zones $A_i$ by an angle $-\beta$. An interdigital periodicity $P_{BN}$ along the vertical direction to the finger direction of the finger-overlap zones $B_i$ is equal to the product of cos $\beta$ and an interdigital periodicity P of the finger-overlap zones $A_i$ and $C_i$. Each finger-overlap zone $B_i$ has a first overlap length $L_{BP}$ along the finger direction thereof and a second overlap length $L_{BN}$ along the finger direction of the finger-overlap zones $A_i$. The overlap length $L_{BP}$ is equal to the product of sec $\beta$ and the overlap length $L_{BN}$. The overlap length $L_{BP}$ is also equal to the product of cosec $\beta$ and the interdigital periodicity P divided by twice the number N of the finger-overlap zones $A_i$. For example, if N=2, the overlap length $L_{BP}$ is not only equal to the product of the overlap length $L_{BN}$ and sec $\beta$, but also equal to the product of P/4 and cosec $\beta$. The finger direction of the finger-overlap zones $D_i$ is slanting to that of the finger-overlap zones $C_i$ by an angle $\alpha$. An interdigital periodicity $P_{DN}$ along the vertical direction to the finger direction of the finger-overlap zones $D_i$ is equal to the product of cos $\alpha$ and the interdigital periodicity P. Each finger-overlap zone $D_i$ has a first overlap length $L_{DP}$ along the finger direction thereof and a second overlap length $L_{DN}$ along the finger direction of the finger-overlap zones $C_i$. The overlap length $L_{DP}$ is equal to the product of sec $\alpha$ and the overlap length $L_{DN}$ as well as the product of half the interdigital periodicity P and cosec $\alpha$, that is the product of P/2 and cosec $\alpha$.

When operating the ultrasonic touch-position sensing device, an electric signal is applied to the input interdigital transducer. In this time, an elastic wave is excited in the bilayer zone $B_T$, and transmitted to the bilayer zone $B_R$ through the monolayer zone. The elastic wave is transduced to N electric signals $E_{ia}$ (i=1, 2, ..., N) and N electric signals $E_{ib}$ (i=1, 2, ..., N), respectively. The sum of the electric signals $E_{ia}$ and $E_{ib}$ is zero, because that the overlap length $L_{DP}$ is equal to the product of sec $\alpha$ and the overlap length $L_{DN}$ as well as the product of P/2 and cosec $\alpha$. The input- and output interdigital transducers form N pairs of ultrasound propagation lanes $Z_{ia}$ and $Z_{ib}$ (i=1, 2, ..., N) in the monolayer zone, an ultrasound propagation lane $Z_{ia}$ existing between the finger-overlap zones $A_i$ and $C_i$, an ultrasound propagation lane $Z_{ib}$ existing between the finger-overlap zones $A_i$ and $C_{(i+1)}$. The ultrasound propagation lanes $Z_{ia}$ and $Z_{ib}$ correspond to positions $F_{ia}$ and $F_{ib}$ (i=1, 2, ..., N) on the upper- or lower end surface of the monolayer zone, respectively. If touching on a position $F_{xa}$, an ultrasound on an ultrasound propagation lane $Z_{xa}$ attenuates, and an electric signal $E_{xb}$ corresponding to an ultrasound propagation lane $Z_{xb}$ is delivered at the output interdigital transducer. In the same way, if touching on a position $F_{xb}$, an ultrasound on the ultrasound propagation lane $Z_{xb}$ attenuates, and an electric signal $E_{xa}$, corresponding to the ultrasound propagation lane $Z_{xa}$ is delivered at the output interdigital transducer, the positions $F_{xa}$ and $F_{xb}$ making a pair. The signal controller senses a touch on the position $F_{xa}$ or $F_{xb}$ by detecting the electric signal $E_{xb}$ or $E_{xa}$, respectively.

According to another aspect of the present invention there are provided two ultrasonic transducing units, each thereof further comprising an amplifier. An output terminal of the output interdigital transducer is connected with an input terminal of the input interdigital transducer and that of the signal controller, via the amplifier. The electric signal $E_{xb}$ or $E_{xa}$, delivered at the output interdigital transducer when touching on the position $F_{xa}$ or $F_{xb}$, has a frequency $f_{xb}$ or $f_{xa}$, respectively. The signal controller senses a touch on the position $F_{xa}$ by detecting the frequency $f_{xb}$ of the electric signal $E_{xb}$, or a touch on the position $F_{xb}$ by detecting the frequency $f_{xa}$ of the electric signal $E_{xa}$.

According to another aspect of the present invention there are provided two ultrasonic transducing units, each thereof further comprising a reference input interdigital transducer, a reference output interdigital transducer, an amplifier, and a phase comparator. The reference input interdigital transducer is formed on the upper- or lower end surface of the first piezoelectric substrate. The reference output interdigital transducer is formed on the upper- or lower end surface of the second piezoelectric substrate. The finger direction of the reference input interdigital transducer is parallel to that of the reference output interdigital transducer. An output terminal of the reference output interdigital transducer is connected not only with an input terminal of the input interdigital transducer and that of the reference input interdigital transducer, but also with an input terminal of the phase comparator, via the amplifier. An output terminal of the output interdigital transducer is connected with an input terminal of the signal controller via the phase comparator. When an electric signal is applied to the reference input interdigital transducer, an elastic wave is excited in the bilayer zone $B_T$, and transmitted to the bilayer zone $B_R$, through the monolayer zone. The elastic wave is transduced to an electric signal with a phase $\theta_{base}$ at the reference output interdigital transducer, and then the electric signal is delivered at the reference output interdigital transducer. On the other hand, the electric signal $E_{xb}$ or $E_{xa}$, delivered at the output interdigital transducer when touching on the position $F_{xa}$ or $F_{xb}$, has a phase $\theta_{xa}$ or $\theta_{xb}$, respectively. The phase comparator detects a difference between the phases $\theta_{base}$ and $\theta_{xa}$, ($\theta_{base}-\theta_{xa}$), or a difference between the phases $\theta_{base}$ and $\theta_{xb}$, ($\theta_{base}-\theta_{xb}$). The signal controller senses a touch on the position $F_{xa}$ by evaluating the phase difference ($\theta_{base}-\theta_{xb}$) or a touch on the position $F_{xb}$ by evaluating the phase difference $\theta_{base}-\theta_{xa}$).

According to another aspect of the present invention there is provided a condition that the thickness h is smaller than the thickness d, the thickness d being smaller than the interdigital periodicity P, the nonpiezoelectric plate being made of a material such that the phase velocity of the elastic wave traveling on the nonpiezoelectric plate alone is higher than that traveling on the first- and second piezoelectric substrates alone.

According to another aspect of the present invention there is provided a condition that the thickness h is approximately equal to the thickness d, the thickness d being smaller than the interdigital periodicity P, the nonpiezoelectric plate being made of a material such that the phase velocity of the elastic wave traveling on the nonpiezoelectric plate alone is approximately equal to that traveling on the first- and second piezoelectric substrates alone.

According to another aspect of the present invention there is provided a condition that the thickness h is larger than the thickness d, the thickness d being smaller than the interdigital periodicity P, the nonpiezoelectric plate being made of a material such that the phase velocity of the elastic wave traveling on the nonpiezoelectric plate alone is lower than that traveling on the first- and second piezoelectric substrates alone.

According to other aspect of the present invention there are provided a first- and a second piezoelectric substrates made of a piezoelectric ceramic, respectively, the polarization axis thereof being parallel to the direction of the thickness d.

According to a further aspect of the present invention there are provided a first- and a second piezoelectric substrates forming a common piezoelectric substrate with a frame-like structure. A beginning end- and a terminal end portions of the first piezoelectric substrate of one of the ultrasonic transducing units are linked with each terminal end portion of the first- and second piezoelectric substrates of the other of the ultrasonic transducing units. A beginning end- and a terminal end portions of the second piezoelectric substrate of the ultrasonic transducing units are linked with each beginning end portion of the first- and second piezoelectric substrates of the other of the ultrasonic transducing units. Thus, all the first- and second piezoelectric substrates of the ultrasonic transducing units forming the common piezoelectric substrate.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
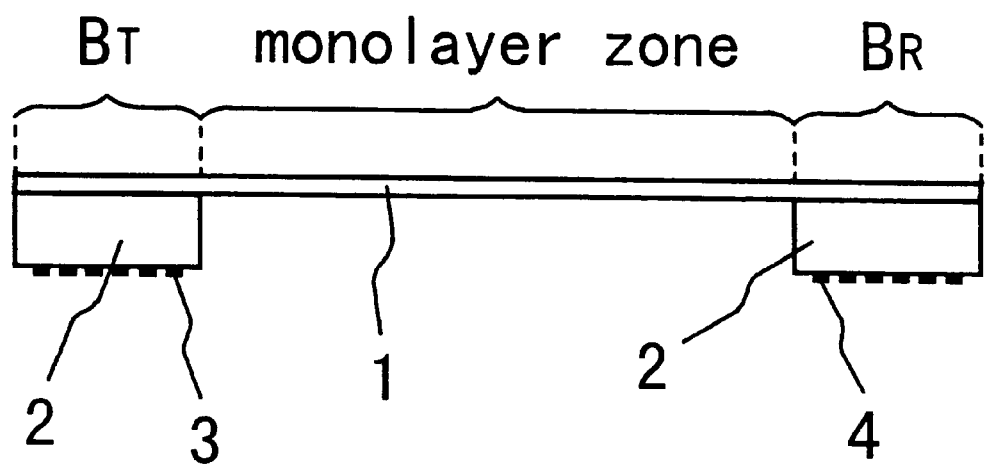
FIG. 1 shows sectional view of an ultrasonic touch-position sensing device according to a first embodiment of the present invention.

FIG. 1 shows sectional view of an ultrasonic touch-position sensing device according to a first embodiment of the present invention. The ultrasonic touch-position sensing device comprises nonpiezoelectric plate 1 having an upper- and a lower end surfaces running perpendicular to the direction of the thickness h thereof, common piezoelectric substrate 2 having a frame-like structure, ultrasonic transducing units X and Y, and signal controller 6 connected with ultrasonic transducing units X and Y. Each of ultrasonic transducing units X and Y contains input interdigital transducer 3 made from aliminium thin film and formed at the lower end surface of piezoelectric substrate 2, output interdigital transducer 4 made from aluminium thin film and formed at the lower end surface of piezoelectric substrate 2, and amplifier 5. FIG. 1 shows only nonpiezoelectric plate 1, piezoelectric substrate 2, and input interdigital transducer 3 and output interdigital transducer 4 of one of ultrasonic transducing units X and Y. Output interdigital transducer 4 is opposed to input interdigital transducer 3. Piezoelectric substrate 2, of which the polarization axis is parallel to the direction of the thickness d thereof, is made from a piezoelectric ceramic with a dimension of 1 mm in thickness d. Nonpiezoelectric plate 1, made from a glass or a polymer such as acrylate resin, teflon, plastic material and so on, has a dimension of 150 $\mu$m in thickness h. The lower end surface of nonpiezoelectric plate 1 is cemented on the upper end surface of piezoelectric substrate 2 through input interdigital transducer 3 and output interdigital transducer 4. Nonpiezoelectric plate 1 and piezoelectric substrate 2 form a bilayer zone $B_T$ and a bilayer zone $B_R$. A remaining part, between the bilayer zones $B_T$ and $B_R$, of nonpiezoelectric plate 1 forms a monolayer zone.

Figure 2:
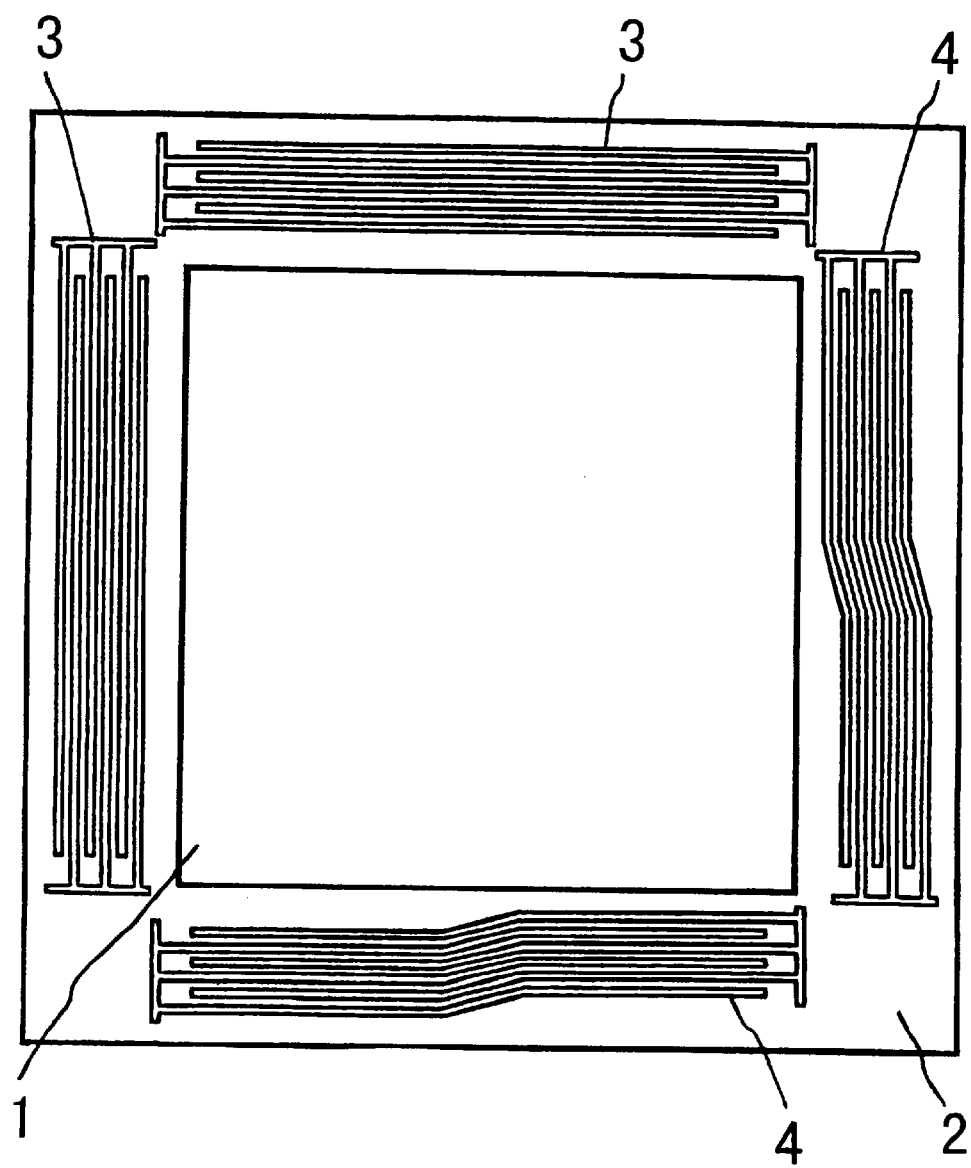
FIG. 2 shows a bottom plan view of the ultrasonic touch-position sensing device in FIG. 1.

FIG. 2 shows a bottom plan view of the ultrasonic touch-position sensing device in FIG. 1. FIG. 2 shows only nonpiezoelectric plate 1, piezoelectric substrate 2, input interdigital transducers 3 having ten finger pairs, respectively, and output interdigital transducers 4 having ten finger pairs, respectively.

Figure 3:
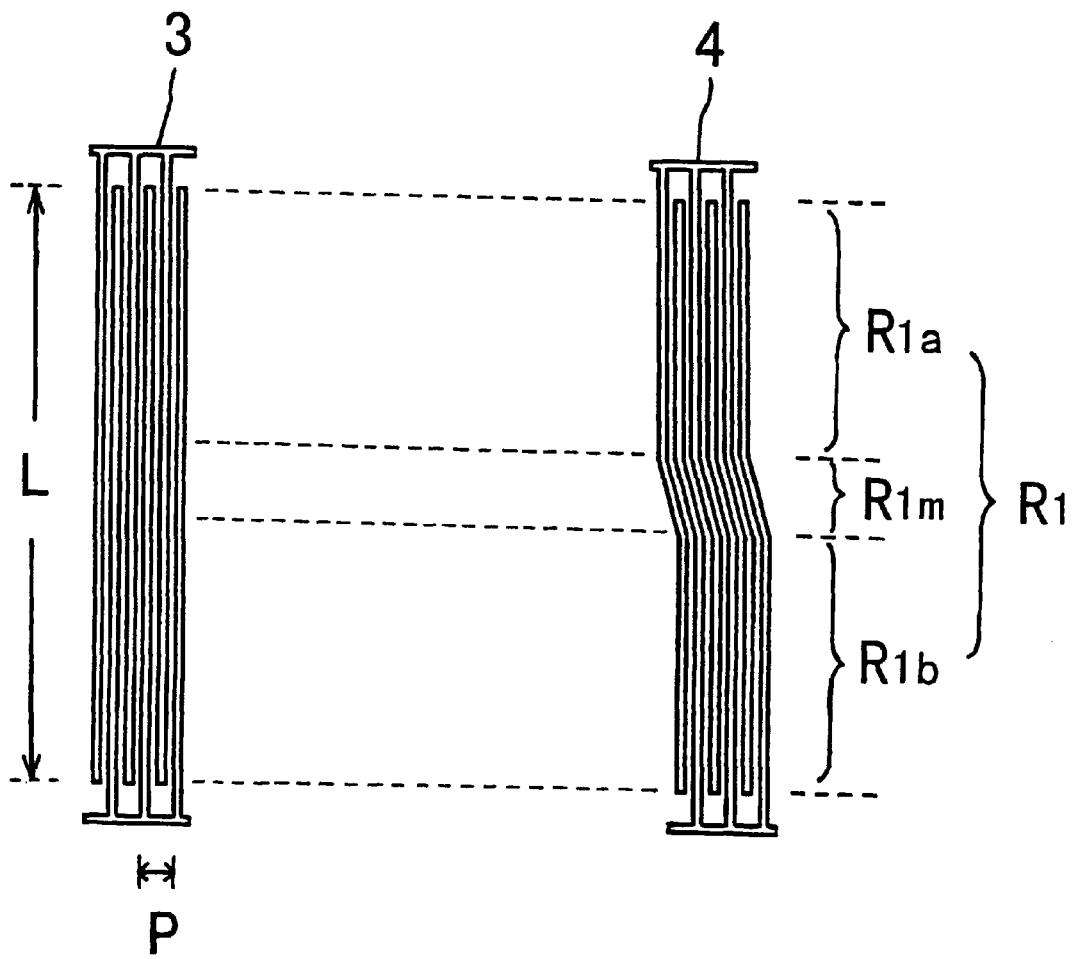
FIG. 3 shows the relative positions of input interdigital transducer 3 and output interdigital transducer 4.

FIG. 3 shows the relative positions of input interdigital transducer 3 and output interdigital transducer 4. Input interdigital transducer 3 has an interdigital periodicity P of 1.6 mm and an overlap length L of 15 mm. Output interdigital transducer 4 has finger-overlap zone R, comprising first zone $R_{1a}$, second zone $R_{1b}$, and third zone $R_{1m}$ between zones $R_{1a}$ and $R_{1b}$. The finger direction of zones $R_{1a}$ and $R_{1b}$ runs parallel with that of input interdigital transducer 3. An interdigital periodicity of zones $R_{1a}$ and $R_{1b}$ is equal to the interdigital periodicity P.

Figure 4:
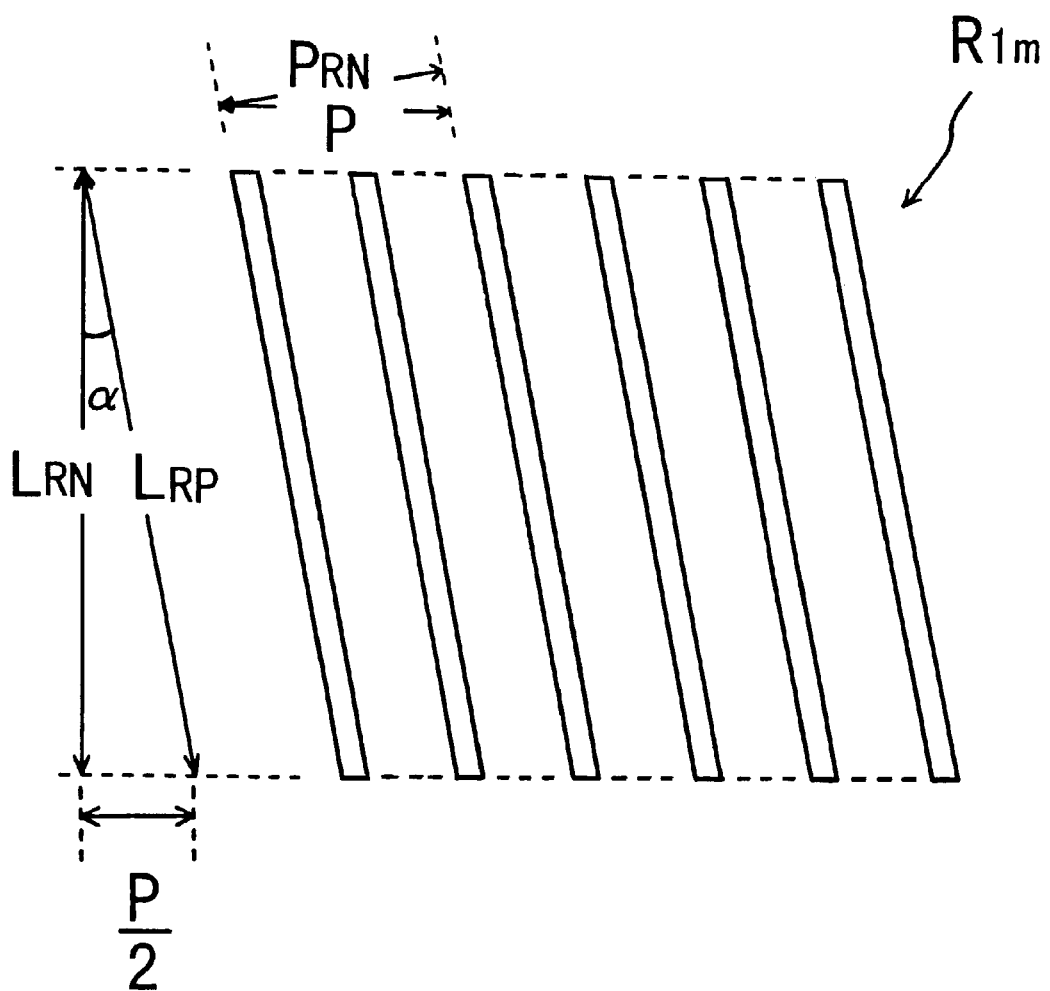
FIG. 4 shows a plan view, on an enlarged scale, of zone $R_{1m}$.

FIG. 4 shows a plan view, on an enlarged scale, of zone $R_{1m}$. The finger direction of zone $R_{1m}$ is slanting to that of input interdigital transducer 3 by an angle $\alpha$. An interdigital periodicity $P_{RN}$ along the vertical direction to the finger direction of zone $R_{1m}$ is equal to the product of the interdigital periodicity P and cos $\alpha$. Zone $R_{1m}$ has a first overlap length $L_{RP}$ along the finger direction thereof and a second overlap length $L_{RN}$ along the finger direction of input interdigital transducer 3. The overlap length $L_{RP}$ is equal to the product of the overlap length $L_{RN}$ and sec $\alpha$ as well as the product of half the interdigital periodicity P and cosec $\alpha$. The sum of the overlap length (7 mm) of zone $R_{1a}$, the overlap length (7 mm) of zone $R_{1b}$ and the overlap length $L_{RN}$ (1 mm) of zone $R_{1m}$ is equal to the overlap length L, (15 mm).

Figure 5:
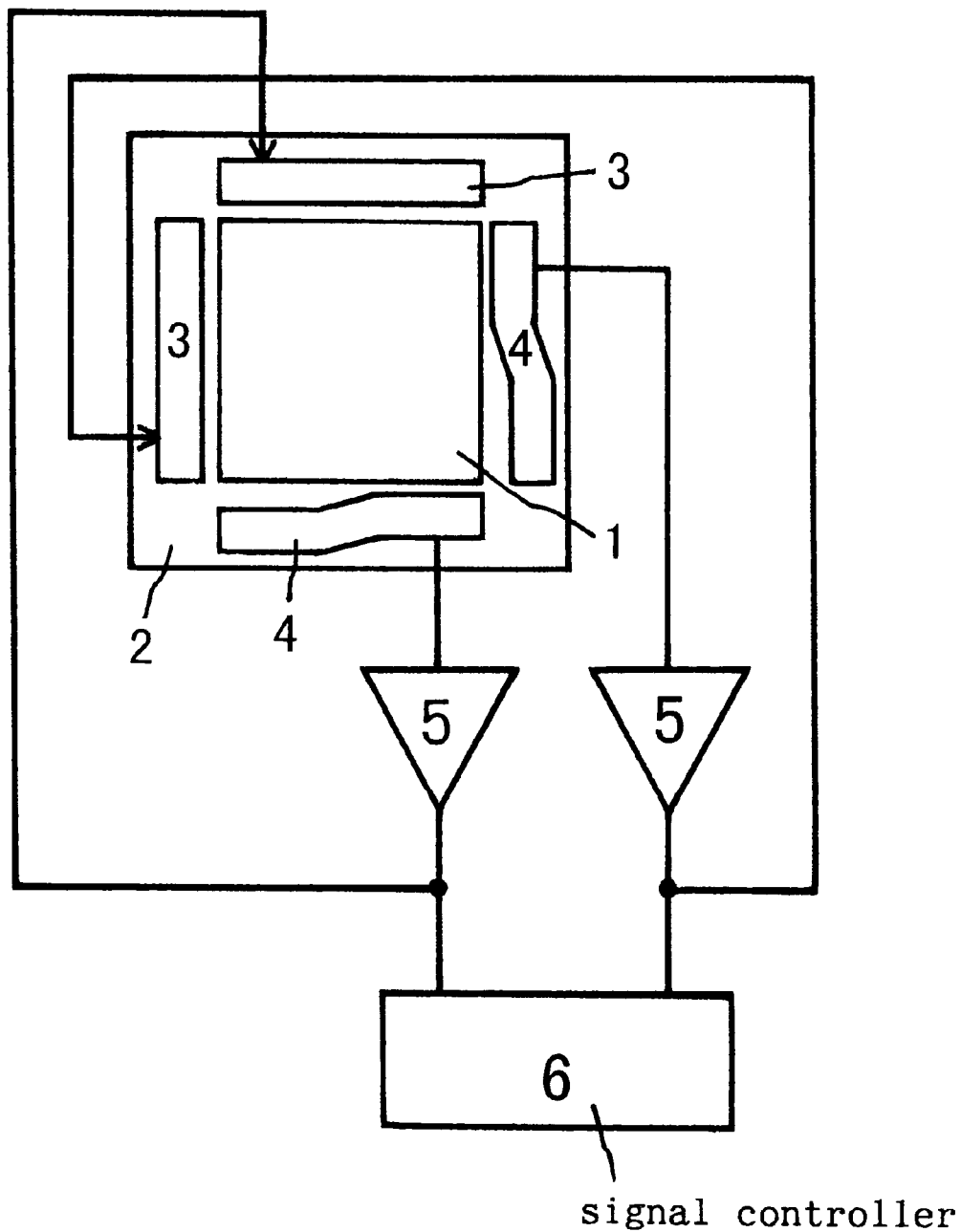
FIG. 5 shows a diagram of a circuit for the ultrasonic touch-position sensing device in FIG. 1.

FIG. 5 shows a diagram of a circuit for the ultrasonic touch-position sensing device in FIG. 1. An output terminal of output interdigital transducer 4 is connected with an input terminal of input interdigital transducer 3 and that of signal controller 6, via amplifier 5. When an electric signal having a frequency approximately corresponding to the interdigital periodicity P is applied to input interdigital transducer 3, an elastic wave of the $S_o$ mode and the higher order modes is excited in the bilayer zone $B_T$ effectively. In this time, if the phase velocity of the elastic wave of the $S_o$ mode and the higher order modes is approximately equal to the phase velocity $V_{fd=o}$, of the $S_o$ mode elastic wave, corresponding to a condition that the product fd of the frequency f of the elastic wave and the thickness d is approximated to be zero, the transducing efficiency from the electric signal to the elastic wave increases, and in addition, the reflection caused by the miss-matching on the acoustic impedance at the boundary surface between nonpiezoelectric plate 1 and piezoelectric substrate 2 never causes. In addition, as piezoelectric substrate 2 is made from a piezoelectric ceramic having the polarization axis parallel to the direction of the thickness d thereof, the elastic wave of the $S_o$ mode and the higher order modes is excited in the bilayer zone $B_T$ effectively, and the transducing efficiency from the electric signal to the elastic wave increases. If using a piezoelectric polymer such as PVDF and so on, as piezoelectric substrate 2, the elastic wave of the $S_o$ mode and the higher order modes is excited in the bilayer zone $B_T$ effectively, and the transducing efficiency from the electric signal to the elastic wave increases. In addition, it is possible to operate the ultrasonic touch-position sensing device under low power consumption and low voltage.

The elastic wave, excited in the bilayer zone $B_T$, having the wavelength approximately equal to the interdigital periodicity P is transmitted to the bilayer zone $B_R$ through the monolayer zone. As the thickness d of piezoelectric substrate 2 is smaller than the interdigital periodicity P, and the thickness h of nonpiezoelectric plate 1 is smaller than the thickness d, it is possible to increase the transmitting efficiency of the elastic wave from the bilayer zone $B_T$ to the bilayer zone $B_R$ on condition that nonpiezoelectric plate 1 is made of a material such that the phase velocity of the elastic wave traveling on nonpiezoelectric plate 1 alone is higher than that traveling on piezoelectric substrate 2 alone.

The elastic wave transmitted to the bilayer zone $B_R$ is transduced to electric signals $E_{1a}$ and $E_{1b}$ at zones $R_{1a}$ and $R_{1b}$, respectively. In this time, the sum of the electric signals $E_{1a}$ and $E_{1b}$ is zero, because that the overlap length $L_{RP}$ is equal to the product of the overlap length $L_{RN}$ and sec $\alpha$ as well as the product of P/2 and cosec $\alpha$. Input interdigital transducer 3 and output interdigital transducer 4 form two ultrasound propagation lanes $Z_{1a}$ and $Z_{1b}$, corresponding to zones $R_{1a}$ and $R_{1b}$, respectively, in the monolayer zone, ultrasound propagation lanes $Z_{1a}$ and $Z_{1b}$ making a pair. Ultrasound propagation lanes $Z_{1a}$ and $Z_{1b}$ correspond to positions $F_{1a}$ and $F_{1b}$ on an upper- or a lower end surface of the monolayer zone, respectively. If touching nowhere on the upper- or lower end surface of the monolayer zone, no electric signal is detected at output interdigital transducer 4. However, if an ultrasound on ultrasound propagation lane $Z_{1a}$ attenuates by touching on position $F_{1a}$, an electric signal $E_{1b}$ having a frequency $f_{1b}$ and corresponding to ultrasound propagation lane $Z_{1b}$ is delivered at output interdigital transducer 4. In the same way, if an ultrasound on ultrasound propagation lane $Z_{1b}$ attenuates by touching on position $F_{1b}$, an electric signal $E_{1a}$ having a frequency $f_{1a}$ and corresponding to ultrasound propagation lane $Z_{1a}$ is delivered at output interdigital transducer 4. Signal controller 6 senses a touch on position $F_{1a}$ by detecting the frequency $f_{1b}$ of the electric signal $E_{1b}$, or a touch on position $F_{1b}$ by detecting the frequency $f_{1a}$ of the electric signal $E_{1a}$. The touched position $F_{1a}$ or $F_{1b}$ with respect to ultrasonic transducing unit X and that with respect to ultrasonic transducing unit Y are specified at the same time. In addition, ultrasound propagation lanes $Z_{1a}$ and $Z_{1b}$ of ultrasonic transducing unit X are vertical to those of ultrasonic transducing unit Y.

The electric signal $E_{1a}$ or $E_{1b}$ delivered at output interdigital transducer 4 is amplified via amplifier 5, a part of the amplified electric signal being applied to input interdigital transducer 3 again. Thus, input interdigital transducer 3, output interdigital transducer 4, and amplifier 5 form an oscillator only when touching on position $F_{1a}$ or $F_{1b}$, causing not only a low voltage operation and low power consumption, but also a small-sized circuit with a simple structure. In addition, the ultrasonic touch-position sensing device is not under the influence of the surroundings, such as a change in temperature.

Figure 6:
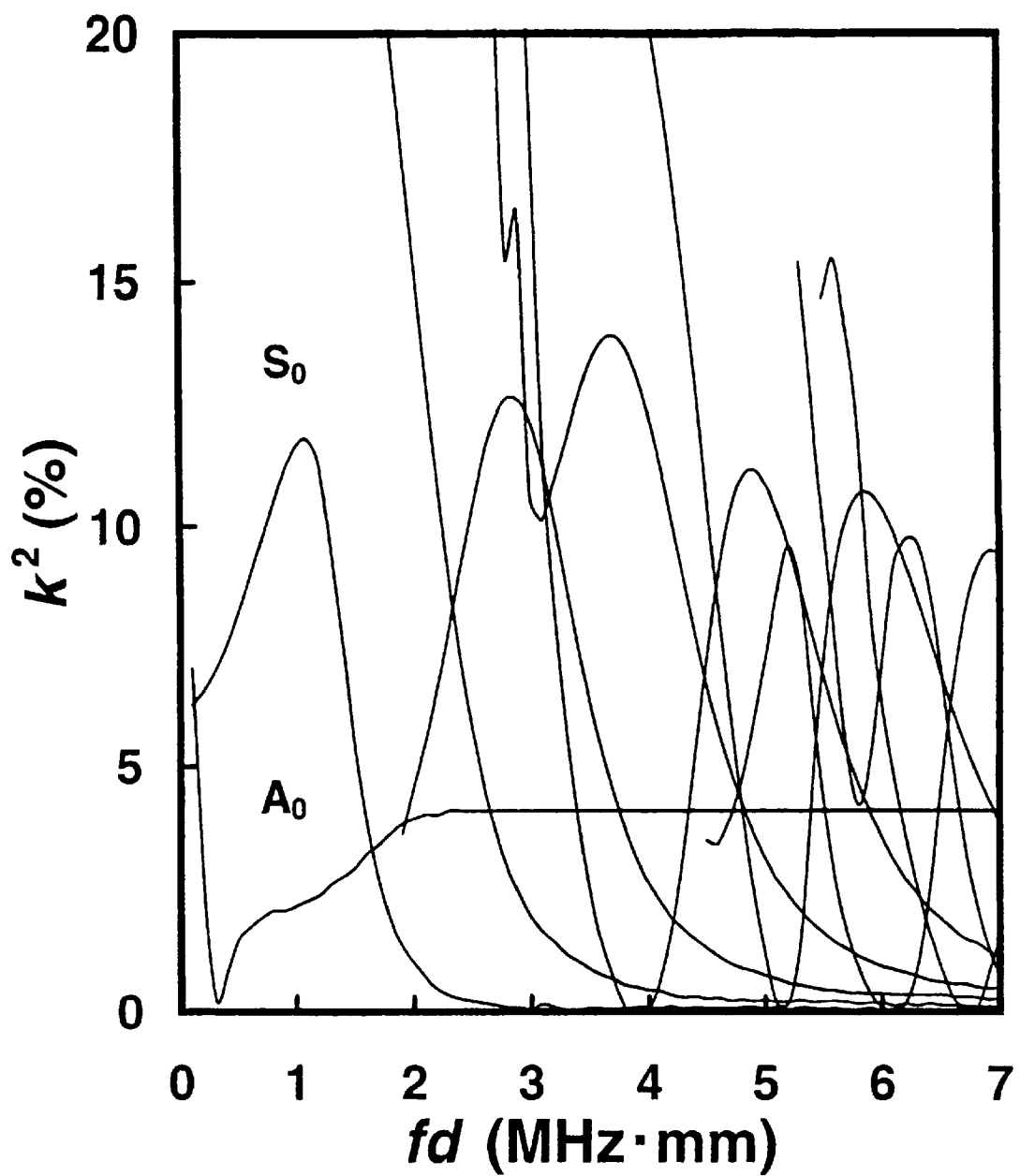
FIG. 6 shows a relationship between the $k^2$ value calculated from the difference between the phase velocity under electrically opened condition and that under electrically shorted condition of piezoelectric substrate 2 of the bilayer zone $B_T$ in FIG. 1, and the fd value.

FIG. 6 shows a relationship between the electromechanical coupling constant $k^2$ calculated from the difference between the phase velocity under electrically opened condition and that under electrically shorted condition of piezoelectric substrate 2 of the bilayer zone $B_T$ in FIG. 1, and the product fd of the frequency f of the elastic wave and the thickness d of piezoelectric substrate 2. In FIG. 6, nonpiezoelectric plate 1 is made from a glass having a shear wave velocity of 4203 m/s and a longitudinal wave velocity of 7604 m/s traveling on the glass alone. The velocities of 4203 m/s and 7604 m/s are about 1.7 times the velocities of a shear- and a longitudinal waves, 2450 m/s and 4390 m/s, respectively, in piezoelectric substrate 2 alone. The $A_o$ mode elastic wave has the $k^2$ value under 5%. Accordingly, it is clear that the elastic wave of all the modes, except for the $A_o$ mode, that is the (lastic wave of the $S_o$ mode and the higher order modes, is excited in the bilayer zone $B_T$ effectively. An electric energy applied to input interdigital transducer 3 is most effectively transduced, for example to the $A_2$ mode elastic wave when the fd value is approximately 3.8 MHz·mm, then the $k^2$ value is approximately 14% being the maximum value. It is clear that the $k^2$ value of 14% is worthy in comparison that a crystallized $LiNbO_3$ used as a popular piezoelectric body for exciting the surface acoustic wave generally has the $k^2$ value of approximately 5%.

Figure 7:
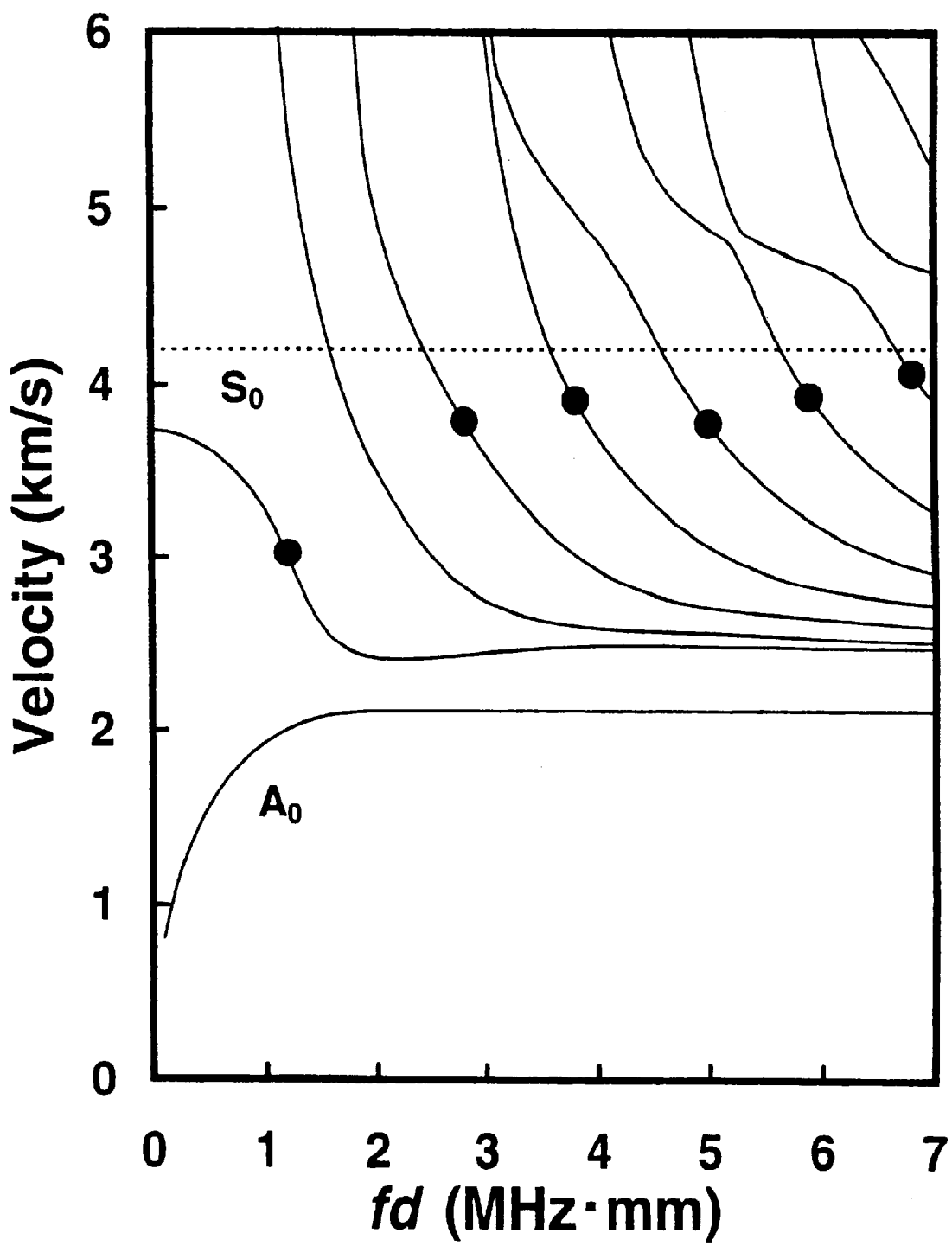
FIG. 7 shows a relationship between the phase velocity of the elastic wave for each mode in the bilayer zone $B_T$ in FIG. 1, and the fd value.

FIG. 7 shows a relationship between the phase velocity of the elastic wave for each mode in the bilayer zone $B_T$ in FIG. 1, and the fd value. In FIG. 7, nonpiezoelectric plate 1 is made from the same glass as FIG. 6. The fd value at each mark ● has the maximum $k^2$ value where an electric energy applied to input interdigital transducer 3 is most effectively transduced the elastic wave, the maximum $k^2$ value being obtained from FIG. 6. The $V_{fd=o}$ value is approximately 3750 m/s, the $V_{fd=o}$ value showing the phase velocity of the $S_o$ mode elastic wave, corresponding to a condition that the product fd of the frequency f of the elastic wave excited in the bilayer zone $B_T$ and the thickness d of piezoelectric substrate 2 is approximated to be zero. The phase velocity at each mark ● is approximately equal to the $V_{fd=o}$ value. Thus, the fd value, in which the phase velocity of the elastic wave in the bilayer zone $B_T$ is approximately equal to the $V_{fd=o}$ value, gives the maximum $k^2$ value.

Figure 8:
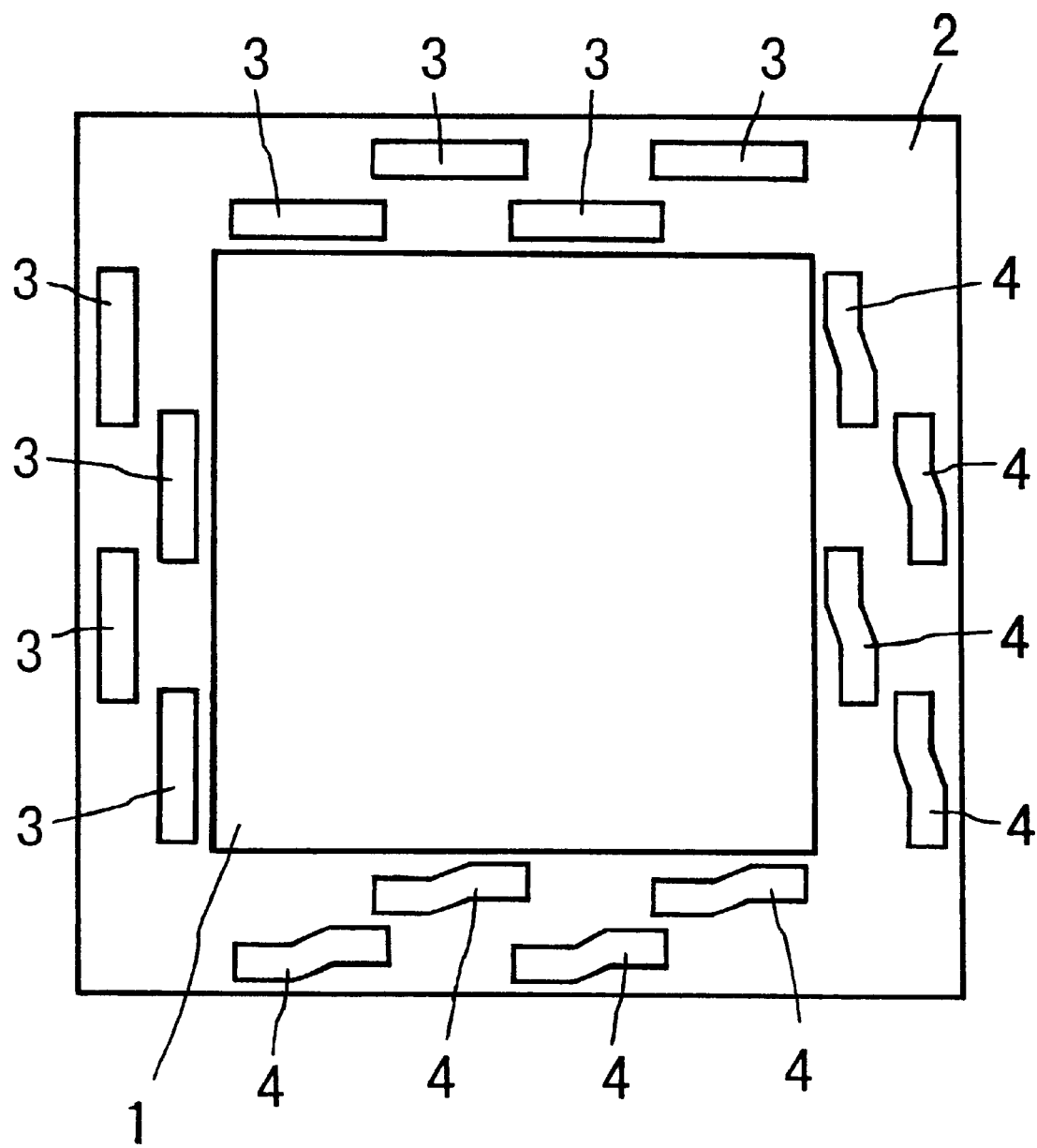
FIG. 8 shows a bottom plan view of the ultrasonic touch-position sensing device according to a second embodiment of the present invention.

FIG. 8 shows a bottom plan view of the ultrasonic touch-position sensing device according to a second embodiment of the present invention. The ultrasonic touch-position sensing device comprises nonpiezoelectric plate 1, piezoelectric substrate 2, ultrasonic transducing units X and Y, and signal controller 6. Each of ultrasonic transducing units X and Y contains four input interdigital transducers 3, four output interdigital transducers 4, amplifier 5, and switch 7. FIG. 8 shows only nonpiezoclectric plate 1, piezoelectric substrate 2, input interdigital transducers 3, and output interdigital transducers 4.

Figure 9:
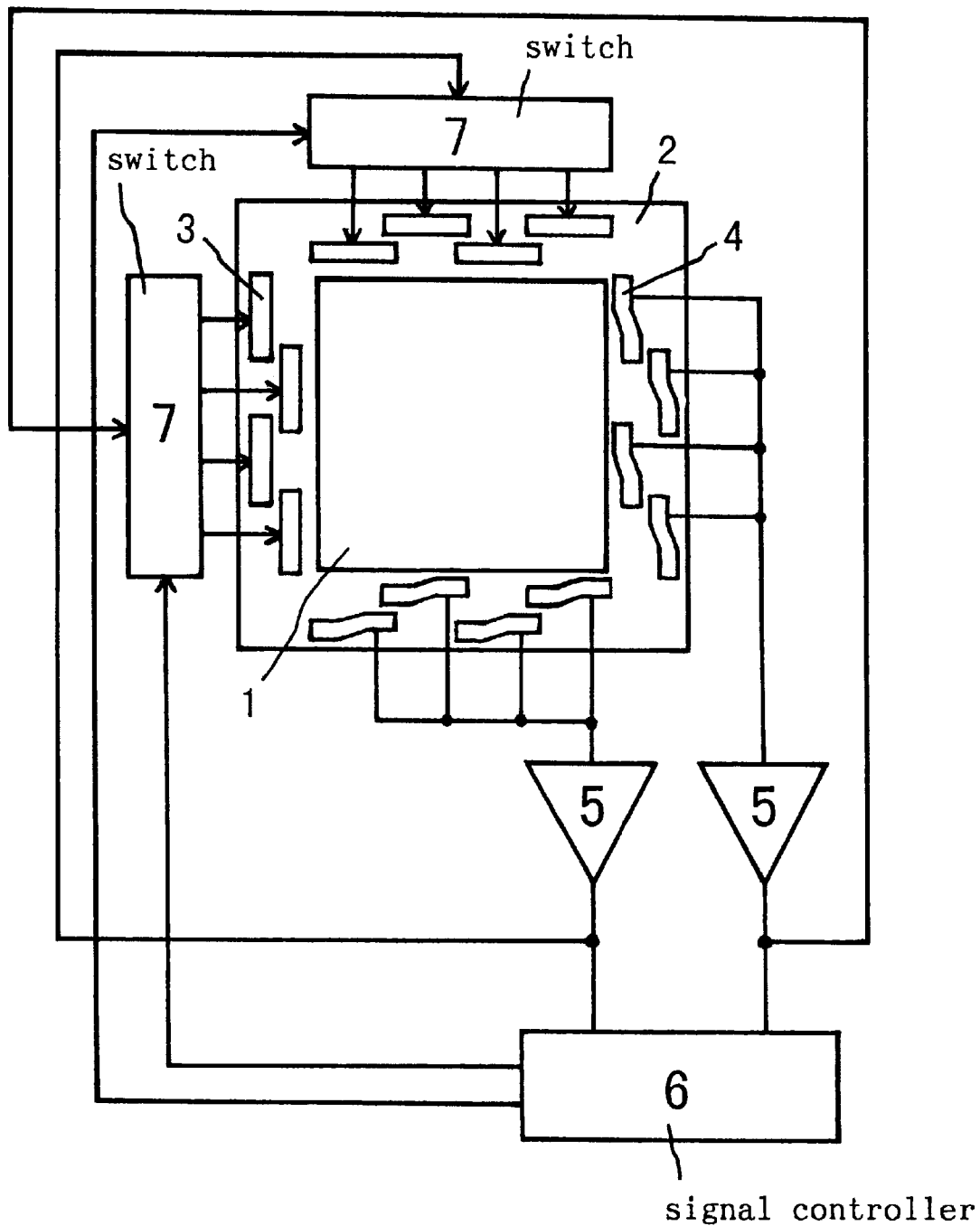
FIG. 9 shows a diagram of a circuit for the ultrasonic touch-position sensing device in FIG. 8.

FIG. 9 shows a diagram of a circuit for the ultrasonic touch-position sensing device in FIG. 8. Output terminals of four output interdigital transducers 4 are connected with each other at an output point. The output point is connected with an input terminal of switch 7 and that of signal controller 6, via amplifier 5. Input terminals of four input interdigital transducers 3 are connected with four output terminals of switch 7 supplying four input interdigital transducers 3 with an electric signal with a fixed period in turn. When an electric signal having a frequency approximately corresponding to the interdigital periodicity P is applied to each input interdigital transducer 3 via switch 7, an elastic wave of the $S_o$ mode and the higher order modes is excited in the bilayer zone $B_T$. The elastic wave having the wavelength approximately equal to the interdigital periodicity P is transmitted to the bilayer zone $B_R$ through the monolayer zone, and transduced to the electric signal $E_{1a}$ with the frequency $f_{1a}$ and the electric signal $E_{1b}$ with the frequency $f_{1b}$, at zones $R_{1a}$ and $R_{1b}$, of each output interdigital transducer 4, respectively. When touching on position $F_{1a}$ or $F_{1b}$ on the upper- or lower end surface of the monolayer zone, the electric signal $E_{1b}$ or $E_{1a}$ is delivered, respectively, at the output point connecting the output terminals of four output interdigital transducers 4. Signal controller 6 senses a touch on position $F_{1a}$ or $F_{1b}$ by detecting the frequency $f_{1b}$ or $f_{1a}$, and by finding only one input interdigital transducer 3 supplied with the electric signal via switch 7 just when the electric signal $E_{1b}$ or $E_{1a}$ is detected at the output point connecting the output terminals of four output interdigital transducers 4. The use of switch 7 causes a small-sized circuit with a simple structure which is very light in weight. The touched position $F_{1a}$ or $F_{1b}$ with respect to ultrasonic transducing unit X and that with respect to ultrasonic transducing unit Y are specified at the same time. The electric signal $E_{1a}$ or $E_{1b}$ delivered at the output point connecting the output terminals of four output interdigital transducers 4 is amplified via amplifier 5, a part of the amplified electric signal being applied to each input interdigital transducer 3, via switch 7, again. Thus, input interdigital transducer 3, output interdigital transducer 4, and amplifier 5 form an oscillator only when touching on position $F_{1a}$ or $F_{1b}$.

Figure 10:
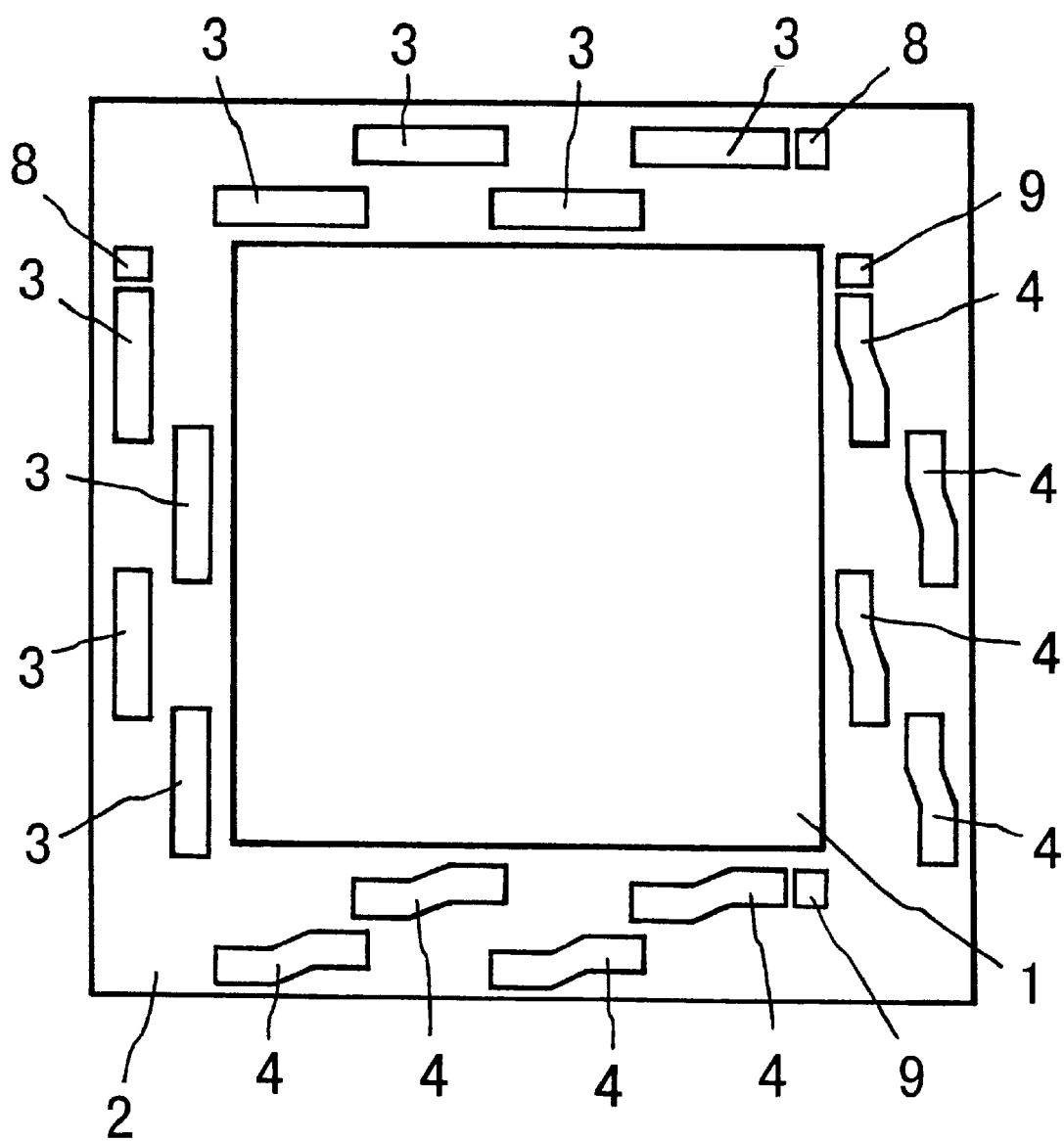
FIG. 10 shows a bottom plan view of an ultrasonic touch-position sensing device according to a third embodiment of the present invention.

FIG. 10 shows a bottom plan view of an ultrasonic touch-position sensing device according to a third embodiment of the present invention. The ultrasonic touch-position sensing device comprises nonpiezoelectric plate 1, piezoelectric substrate 2, ultrasonic transducing units X and Y, and signal controller 6. Each of ultrasonic transducing units X and Y contains reference input interdigital transducer 8, reference output interdigital transducer 9, four input interdigital transducers 3, four output interdigital transducers 4, amplifier 5, amplifier 10, switch 7, and phase comparator 11. FIG. 10 shows only nonpiezoelectric plate 1, piezoelectric substrate 2, input interdigital transducers 3, output interdigital transducers 4, reference input interdigital transducers 8 and reference output interdigital transducers 9. Reference input interdigital transducer 8 and reference output interdigital transducer 9 have the same regular-type constructions, and have ten finger pairs and an interdigital periodicity P of 1.6 mm, respectively.

Figure 11:
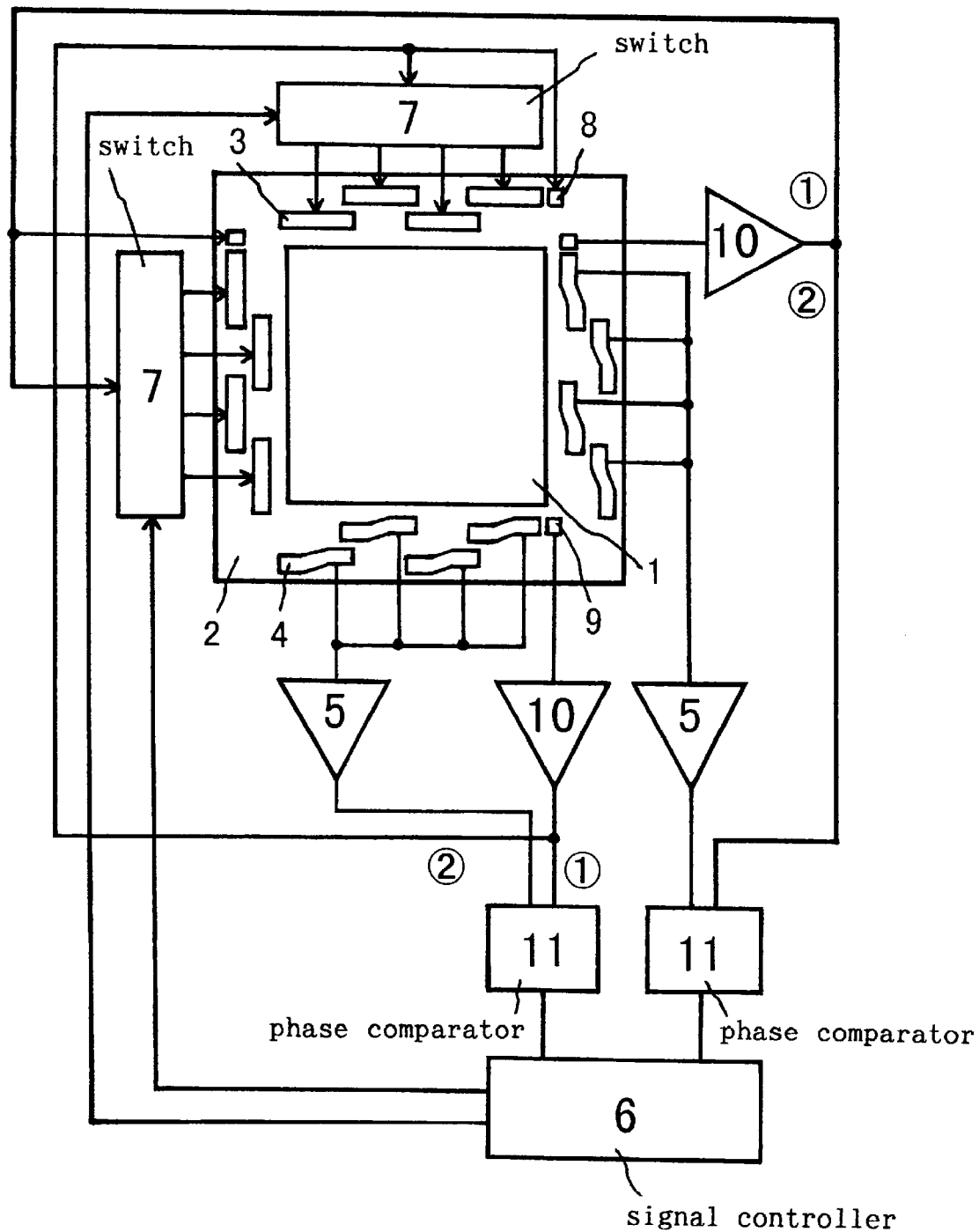
FIG. 11 shows a diagram of a circuit for the ultrasonic touch-position sensing device in FIG. 10.
Figure 13:
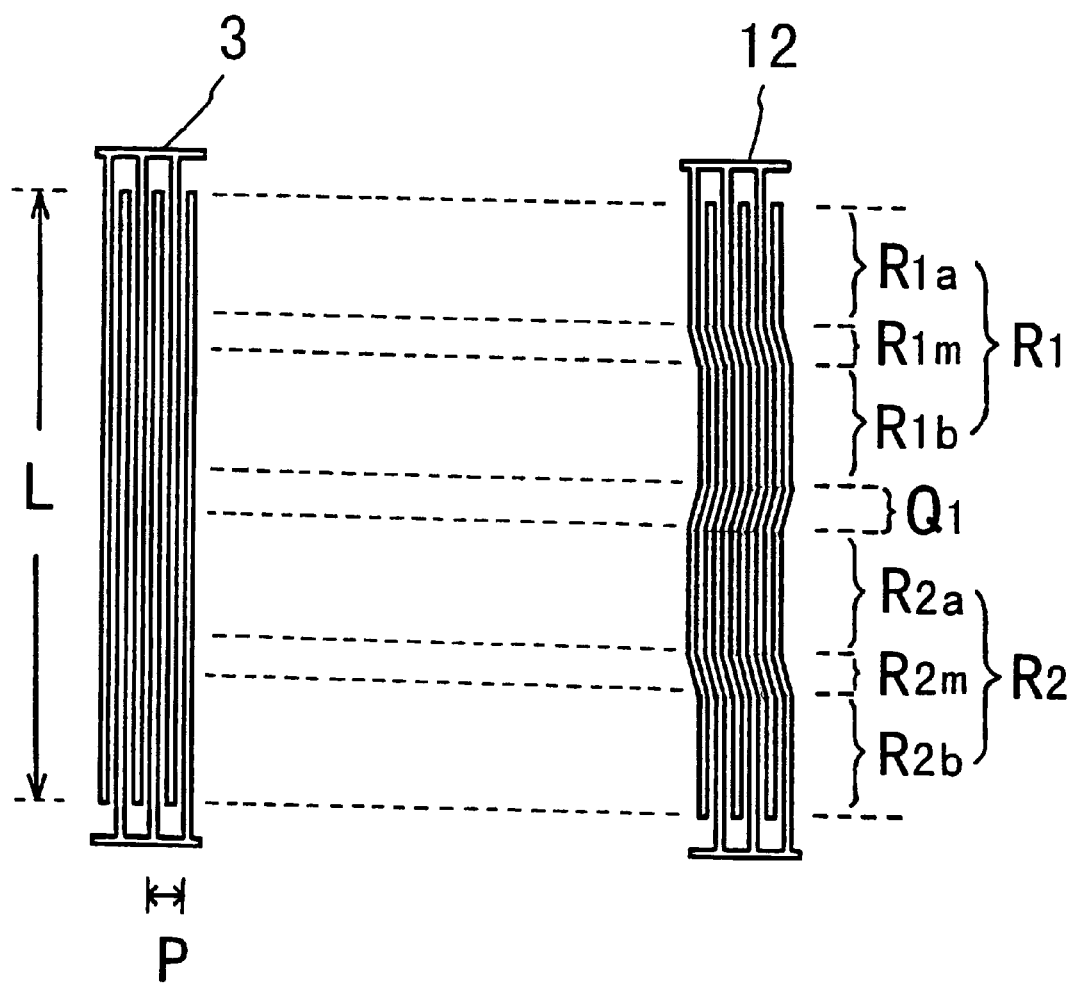
FIG. 13 shows the relative positions of input interdigital transducer 3 and output interdigital transducer 12 having ten finger pairs.

FIG. 11 shows a diagram of a circuit for the ultrasonic touch-position sensing device in FIG. 13. Output terminals of four output interdigital transducers 4 are connected with each other at an output point. The output point is connected with an input terminal of phase comparator 11 via amplifier 5. An output terminal of reference output interdigital transducer 9 is connected with an input terminal of reference input interdigital transducer 8, an input terminal of switch 7 and the input terminal of phase comparator 11, via amplifier 10. Input terminals of four input interdigital transducers 3 are connected with four output terminals of switch 7. When an electric signal having a frequency approximately corresponding to the interdigital periodicity P of reference input interdigital transducer 8 is applied to reference input interdigital transducer 8, an elastic wave of the $S_o$ mode and the higher order modes is excited in the bilayer zone $B_T$. The elastic wave having the wavelength approximately equal to the interdigital periodicity P is transmitted to the bilayer zone $B_R$ through the monolayer zone, and transduced to an electric signal with a phase $\theta_{base}$ at reference output interdigital transducer 9, the electric signal being delivered from reference output interdigital transducer 9 and amplified via amplifier 10. An amplified electric signal $\hat{3}$ is applied to reference input interdigital transducer 8 and switch 7, again. Thus, reference input interdigital transducer 8, reference output interdigital transducer 9 and amplifier 10 form an oscillator. The other amplified electric signal $\hat{2}$ is applied to phase comparator 11. When an electric signal is applied to each input interdigital transducer 3 via switch 7, an elastic wave is excited in the bilayer zone $B_T$. The elastic wave is transduced to the electric signal $E_{1a}$ with a phase $\theta_{1a}$ and the electric signal $E_{1b}$ with a phase $\theta_{1b}$, at zones $R_{1a}$ and $R_{1b}$ of each output interdigital transducer 4, respectively. When touching on position $F_{1a}$ or $F_{1b}$ on the upper- or lower end surface of the monolayer zone, the electric signal $E_{1b}$ or $E_{1a}$ is delivered, respectively, at the output point connecting the output terminals of four output interdigital transducers 4. The electric signal $E_{1b}$ or $E_{1a}$ is applied, via amplifier 5, to phase comparator 11 detecting a difference between the phases $\theta_{1b}$ and $\theta_{base}$, $(\theta_{base}-\theta_{1b})$, or a difference between the phases $\theta_{1a}$ and $\theta_{base}$, $(\theta_{base}-\theta_{1a})$. Signal controller 6 senses a touch on position $F_{1a}$ or $F_{1b}$ by evaluating the phase difference $(\theta_{base}-\theta_{1b})$ or the phase difference $(\theta_{base}-\theta_{1a})$, respectively, and by finding only one input interdigital transducer 3 supplied with the electric signal via switch 7 just when the electric signal $E_{1b}$ or $E_{1a}$ is detected at the output point connecting the output terminals of four output interdigital transducers 4. The touched position $F_{1a}$ or $F_{1b}$ with respect to ultrasonic transducing unit X and that with respect to ultrasonic transducing unit Y are specified at the same time.

Figure 12:
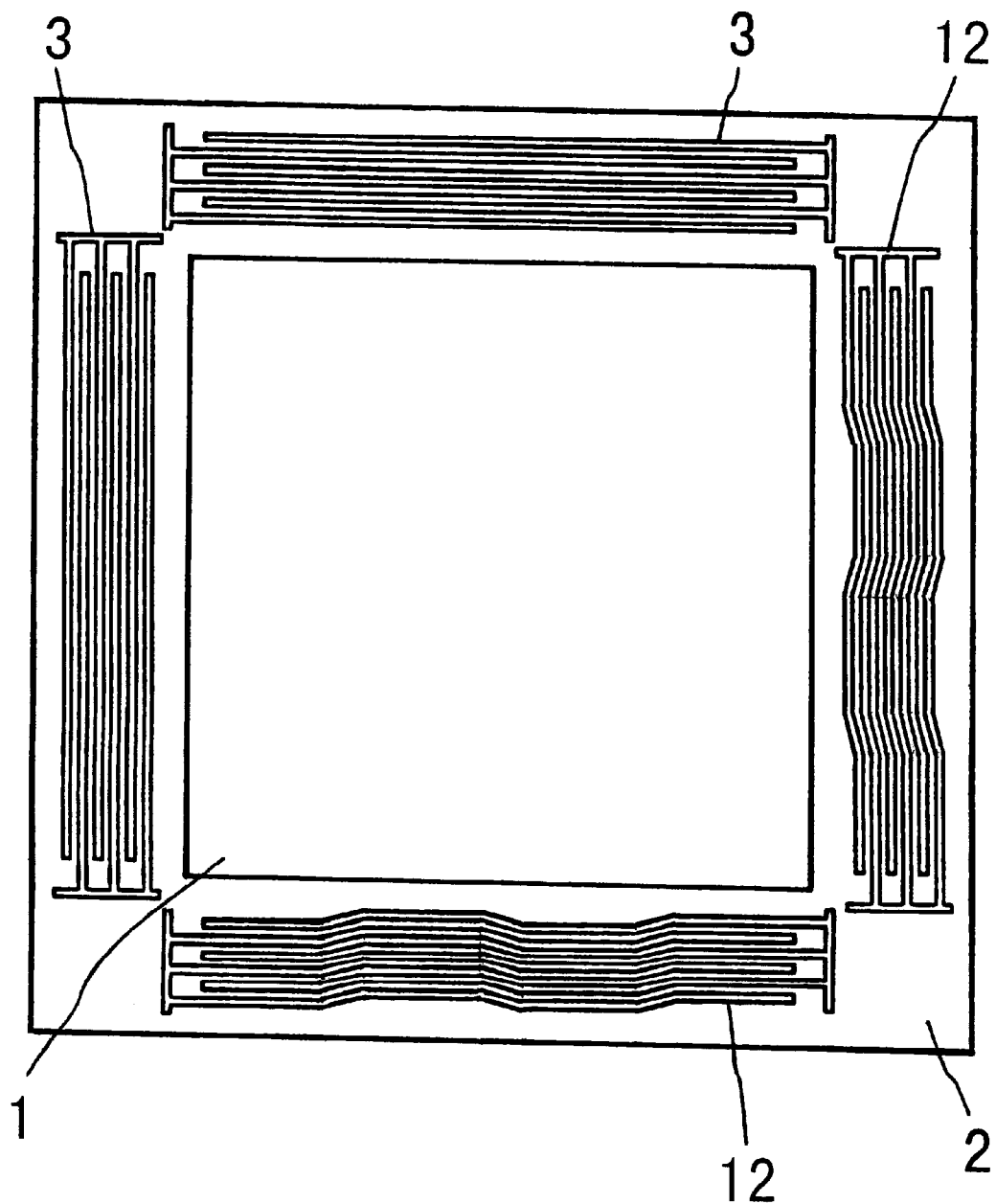
FIG. 12 shows a bottom plan view of an ultrasonic touch-position sensing device according to a fourth embodiment of the present invention.

FIG. 12 shows a bottom plan view of an ultrasonic touch-position sensing device according to a fourth embodiment of the present invention. The ultrasonic touch-position sensing device has the same construction as FIG. 2, except for using of output interdigital transducer 12 in place of output interdigital transducer 4. FIG. 12 shows only nonpiezoelectric plate 1, piezoelectric substrate 2, input interdigital transducers 3 and output interdigital transducers 12.

FIG. 13 shows the relative positions of input interdigital transducer 3 and output interdigital transducer 12 having ten finger pairs. Output interdigital transducer 12 has finger-overlap zones $R_1$ and $R_2$, and finger-overlap zone $Q_1$ between finger-overlap zones $R_1$ and $R_2$. In other words, output interdigital transducer 12 has N finger-overlap zones $R_i$ (i=1, 2, ..., N) and N-1 finger-overlap zones $Q_i$ {i=1, 2, ..., (N-1)} between two finger-overlap zones $R_i$ and $R_{(i+1)}$, then N is two. Finger-overlap zone $R_1$ comprises first zone $R_{1a}$, second zone $R_{1b}$, and third zone $R_{1m}$ between zones $R_{1a}$ and $R_{1b}$. Finger-overlap zone $R_2$ comprises first zone $R_{2a}$, second zone $R_{2b}$, and third zone $R_{2m}$ between zones $R_{2a}$ and $R_{2b}$. The finger direction of zones $R_{1a}$, $R_{1b}$, $R_{2a}$ and $R_{2b}$, runs parallel with that of input interdigital transducer 3. An interdigital periodicity of zones $R_{1a}$, $R_{1b}$, $R_{2a}$ and $R_{2b}$, is equal to the interdigital periodicity P of input interdigital transducer 3. A structure of zone $R_{2m}$ is the same as that of zone $R_{1m}$, which is equivalent to zone $R_{1m}$ in FIG. 4.

Figure 14:
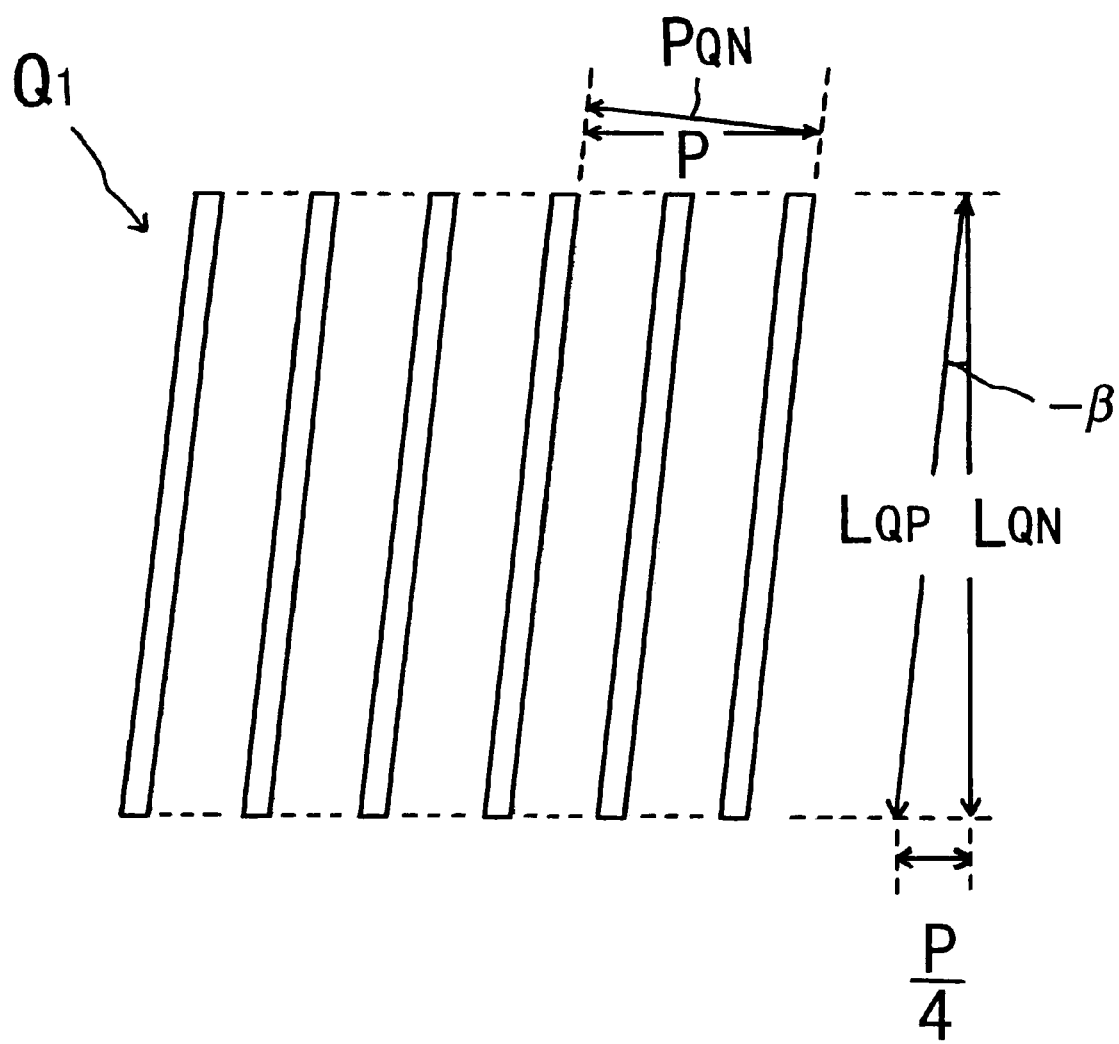
FIG. 14 shows a plan view, on an enlarged scale, of finger-overlap zone $Q_1$.

FIG. 14 shows a plan view, on an enlarged scale, of finger-overlap zone $Q_1$. The finger direction of finger-overlap zone $Q_1$, can be slanting to that of input interdigital transducer 3 by an angle $+\beta$ or $-\beta$, that is $\pm\beta$. However, in this embodiment, the finger direction of finger-overlap zone $Q_1$. is slanting to that of input interdigital transducer 3 by an angle $-\beta$. An interdigital periodicity $P_{QN}$ along the vertical direction to the finger direction of finger-overlap zone $Q_1$ is equal to the product of the interdigital periodicity P and cos $\beta$. Finger-overlap zone $Q_1$ has a first overlap length $L_{QP}$ along the finger direction thereof and a second overlap length $L_{QN}$ along the finger direction of input interdigital transducer 3. The overlap length $L_{QP}$ is equal to the product of the overlap length $L_{QN}$ and sec $\beta$. The overlap length $L_{QP}$ is also equal to the product of cosec $\beta$ and the interdigital periodicity P divided by 4, that is, the product of P/4 and cosec $\beta$. The sum of the overlap length (3 mm) of zone $R_{1a}$, the overlap length (3 mm) of zone $R_{1b}$, the overlap length (3 mm) of zone $R_{2a}$, the overlap length (3 mm) of zone $R_{2b}$, the overlap length $L_{RN}$ (1 mm) of zone $R_{1m}$, the overlap length $L_{RN}$ (1 mm) of zone $R_{2m}$, and the overlap length $L_{QN}$ (1 mm) of finger-overlap zone $Q_1$ is equal to the overlap length L (15 mm).

When operating the ultrasonic touch-position sensing device according to the fourth embodiment in FIG. 12, the circuit, in FIG. 4, except for using of output interdigital transducer 12 in place of output interdigital transducer 4, is available. If an electric signal is applied to input interdigital transducer 3, an elastic wave is excited in the bilayer zone $B_T$. The elastic wave is transmitted to the bilayer zone $B_R$ through the monolayer zone, and transduced to electric signals $E_{1a}$, $E_{1b}$, $E_{2a}$ and $E_{2b}$, at zones $R_{1a}$, $R_{1b}$, $R_{2a}$ and $R_{2b}$, respectively. In this time, the sum of the electric signals $E_{1a}$ and $E_{1b}$ is zero, and the sum of the electric signals $E_{2a}$ and $E_{2b}$ is zero, because that the overlap length $L_{RP}$ is equal to the product of the overlap length $L_{RN}$ and sec $\alpha$ as well as the product of P/2 and cosec $\alpha$. Input interdigital transducer 3 and output interdigital transducer 12 form four ultrasound propagation lanes $Z_{1a}$, $Z_{1b}$, $Z_{2a}$ and $Z_{2b}$, in the monolayer zone, corresponding to zones $R_{1a}$, $R_{1b}$, $R_{2a}$ and $R_{2b}$, respectively, ultrasound propagation lanes $Z_{1a}$ and $Z_{1b}$ making a pair, and ultrasound propagation lanes $Z_{2a}$ and $Z_{2b}$ making a pair. Ultrasound propagation lanes $Z_{1a}$, $Z_{1b}$, $Z_{2a}$ and $Z_{2b}$ correspond to positions $F_{1a}$, $F_{1b}$, $F_{2a}$ and $F_{2b}$, on the upper- or lower end surface of the monolayer zone, respectively. When touching on position $F_{1a}$, $F_{1b}$, $F_{2a}$ or $F_{2b}$, the electric signal $E_{1b}$, $E_{1a}$, $E_{2a}$ or $E_{2b}$ is delivered, respectively, at output interdigital transducer 12. The electric signal $E_{1b}$, $E_{1a}$, $E_{2a}$ or $E_{2b}$ has the frequency $f_{1b}$, $f_{1a}$, $f_{2b}$ or $f_{2a}$ respectively. Signal controller 6 senses a touch on position $F_{1a}$, $F_{1b}$, $F_{2a}$ or $F_{2b}$ by detecting the frequency $f_{1b}$, $f_{1a}$, $f_{2b}$ or $f_{2a}$, respectively. The touched position $F_{1a}$, $F_{1b}$, $F_{2a}$ or $F_{2b}$ with respect to ultrasonic transducing unit X and that with respect to ultrasonic transducing unit Y are specified at the same time.

If the ultrasonic touch-position sensing device according to the second embodiment in FIG. 8 has output interdigital transducer 12 in place of output interdigital transducer 4, the circuit, in FIG. 9, except for using of output interdigital transducer 12 in place of output interdigital transducer 4, is available. When an electric signal is applied to each input interdigital transducer 3 via switch 7, an elastic wave is excited in the bilayer zone $B_T$. The elastic wave is transmitted to the bilayer zone $B_R$ through the monolayer zone, and transduced to the electric signals $E_{1a}$, $E_{1b}$, $E_{2a}$ and $E_{2b}$, at zones $R_{1a}$, $R_{1b}$, $R_{2a}$ and $R_{2b}$ of each output interdigital transducer 12, respectively. When touching on position $F_{1a}$, $F_{1b}$, $F_{2a}$ or $F_{2b}$, the electric signal $E_{1b}$, $E_{1a}$, $E_{2b}$ or $E_{2a}$ is delivered, respectively, at the output point connecting the output terminals of four output interdigital transducers 12. Signal controller 6 senses a touch on position $F_{1a}$, $F_{1b}$, $F_{2a}$ or $F_{2b}$ by detecting the frequency $f_{1b}$, $f_{1a}$, $f_{2b}$ or $f_{2a}$, respectively, and by finding only one input interdigital transducer 3 supplied with the electric signal via switch 7 just when the electric signal $E_{1b}$, $E_{1a}$, $E_{2b}$ or $E_{2a}$ is detected at the output point connecting the output terminals of four output interdigital transducers 12. The touched position $F_{1a}$, $F_{1b}$, $F_{2a}$ or $F_{2b}$ with respect to ultrasonic transducing unit X and that with respect to ultrasonic transducing unit Y are specified at the same time.

If the ultrasonic touch-position sensing device according to the third embodiment in FIG. 10 has output interdigital transducer 12 in place of output interdigital transducer 4, the circuit, in FIG. 11, except for using of output interdigital transducer 12 in place of output interdigital transducer 4, is available. When an electric signal is applied to each input interdigital transducer 3 via switch 7, an elastic wave is excited in the bilayer zone $B_T$. The elastic wave is transmitted to the bilayer zone $B_R$ through the monolayer zone, and transduced to the electric signals $E_{1a}$, $E_{1b}$, $E_{2a}$ and $E_{2b}$, at zones $R_{1a}$, $R_{1b}$, $R_{2a}$ and $R_{2b}$ of each output interdigital transducer 12, respectively. When touching on position $F_{1a}$, $F_{1b}$, $F_{2a}$ or $F_{2b}$, the electric signal $E_{1b}$, $E_{1a}$, $E_{2b}$ or $E_{2a}$, is delivered, respectively, at the output point connecting the output terminals of four output interdigital transducers 12. The electric signal $E_{1b}$, $E_{1a}$, $E_{2b}$ or $E_{2a}$, having a phase $\theta_{1b}$, $\theta_{1a}$, $\theta_{2b}$ or $\theta_{2a}$, respectively, is applied, via amplifier 5, to phase comparator 11 detecting a difference between the phases $\theta_{1b}$ and $\theta_{base}$, $(\theta_{base}-\theta_{1b})$, a difference between the phases $\theta_{1a}$ and $\theta_{base}$, $(\theta_{base}-\theta_{1a})$, a difference between the phases $\theta_{2b}$ and $\theta_{base}$, $(\theta_{base}-\theta_{2b})$, or a difference between the phases $\theta_{2a}$ and $\theta_{base}$, $(\theta_{base}-\theta_{2a})$. Signal controller 6 senses a touch on position $F_{1a}$, $F_{1b}$, $F_{2a}$ or $F_{2b}$ by evaluating the phase difference $(\theta_{base}-\theta_{1b})$, the phase difference $(\theta_{base}-\theta_{1a})$, the phase difference $(\theta_{base}-\theta_{2b})$, or the phase difference $(\theta_{base}-\theta_{2a})$, respectively, and by finding only one input interdigital transducer 3 supplied with the electric signal via switch 7 just when the electric signal $E_{1b}$, $E_{1a}$, $E_{2b}$ or $E_{2a}$ is detected at the output point connecting the output terminals of four output interdigital transducers 12. The touched position $F_{1a}$, $F_{1b}$, $F_{2a}$ or $F_{2b}$ with respect to ultrasonic transducing unit X and that with respect to ultrasonic transducing unit Y are specified at the same time.

Figure 15:
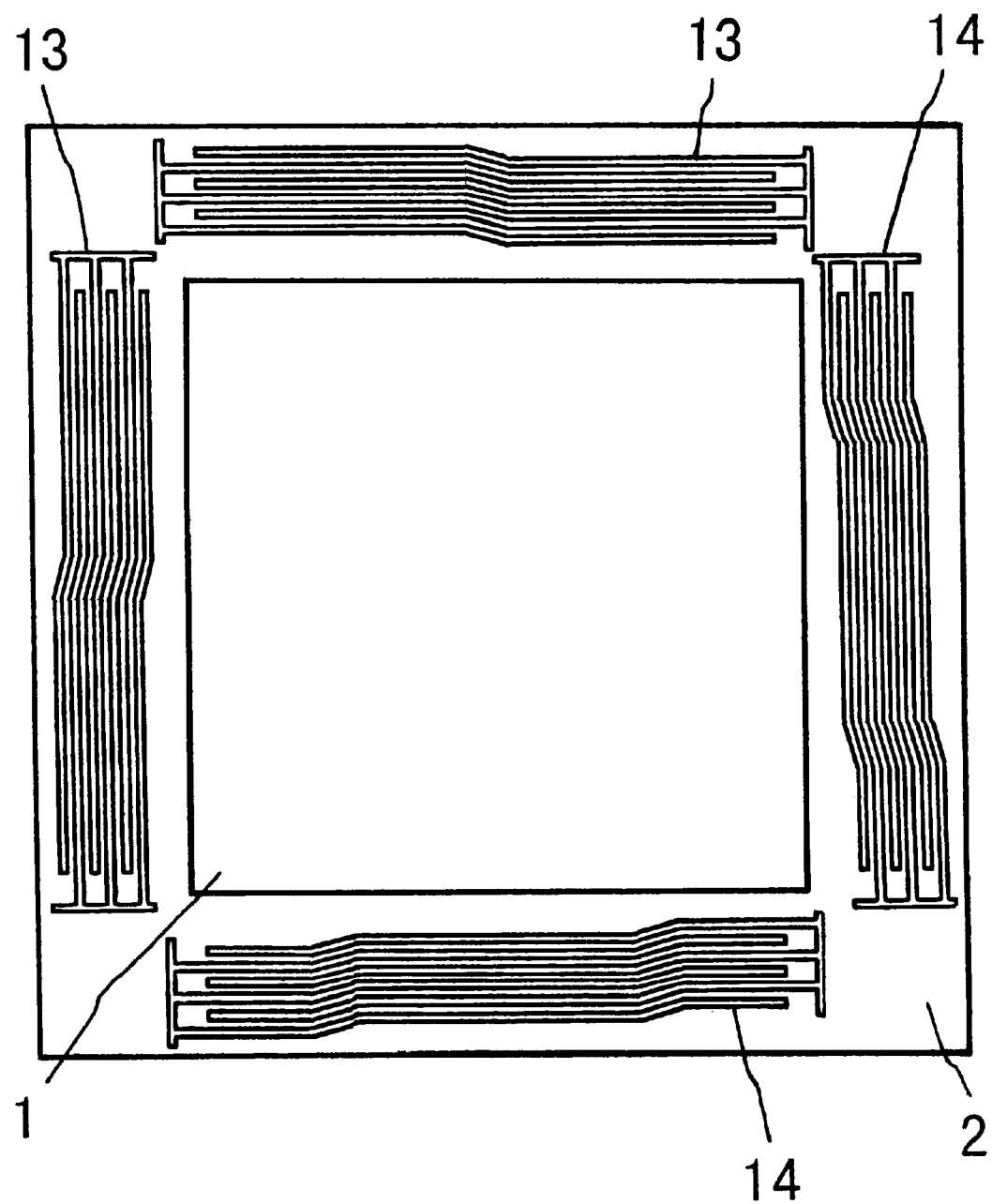
FIG. 15 shows a bottom plan view of an ultrasonic touch-position sensing device according to a fifth embodiment of the present invention.

FIG. 15 shows a bottom plan view of an ultrasonic touch-position sensing device according to a fifth embodiment of the present invention. The ultrasonic touch-position sensing device has the same construction as FIG. 2, except for using of input interdigital transducer 13 and output interdigital transducer 14 in place of input interdigital transducer 3 and output interdigital transducer 4, respectively. FIG. 15 shows only nonpiezoelectric plate 1, piezoelectric substrate 2, input interdigital transducers 13 and output interdigital transducers 14.

Figure 16:
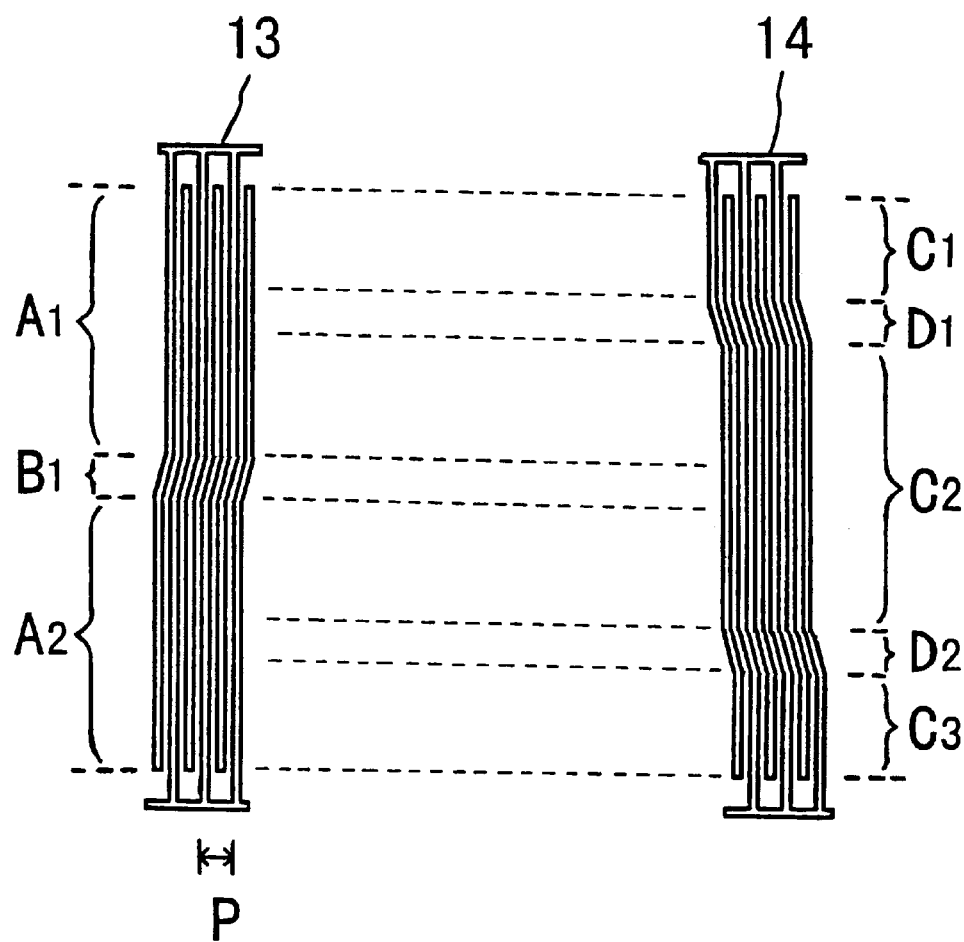
FIG. 16 shows the relative positions of input interdigital transducer 13 and output interdigital transducer 14 having ten finger pairs, respectively.

FIG. 16 shows the relative positions of input interdigital transducer 13 and output interdigital transducer 14 having ten finger pairs, respectively. Input interdigital transducer 13 has finger-overlap zones $A_1$ and $A_2$, and finger-overlap zone $B_1$. between finger-overlap zones $A_1$ and $A_2$. Output interdigital transducer 14 has finger-overlap zones $C_1$, $C_2$ and $C_3$, finger-overlap zone $D_1$ between finger-overlap zones $C_1$ and $C_2$, and finger-overlap zone $D_2$ between finger-overlap zones $C_2$ and $C_3$. In other words, input interdigital transducer 13 has N finger-overlap zones $A_i$ (i=1, 2, ..., N) and N−1 finger-overlap zones $B_i \{i=1, 2, ..., (N-1)\}$, and output interdigital transducer 14 has N+1 finger-overlap zones $C_{i\{i=1, 2, ..., (N+1)\}}$ and N finger-overlap zones $D_i$ (i=1, 2, ..., N), then N is two. The finger direction of finger-overlap zones $A_1$ and $A_2$ runs parallel with that of finger-overlap zones $C_1$, $C_2$ and $C_3$. Each of finger-overlap zones $A_1$, $A_2$, $C_1$, $C_2$ and $C_3$ has an interdigital periodicity P of 1.6 mm.

Figure 17:
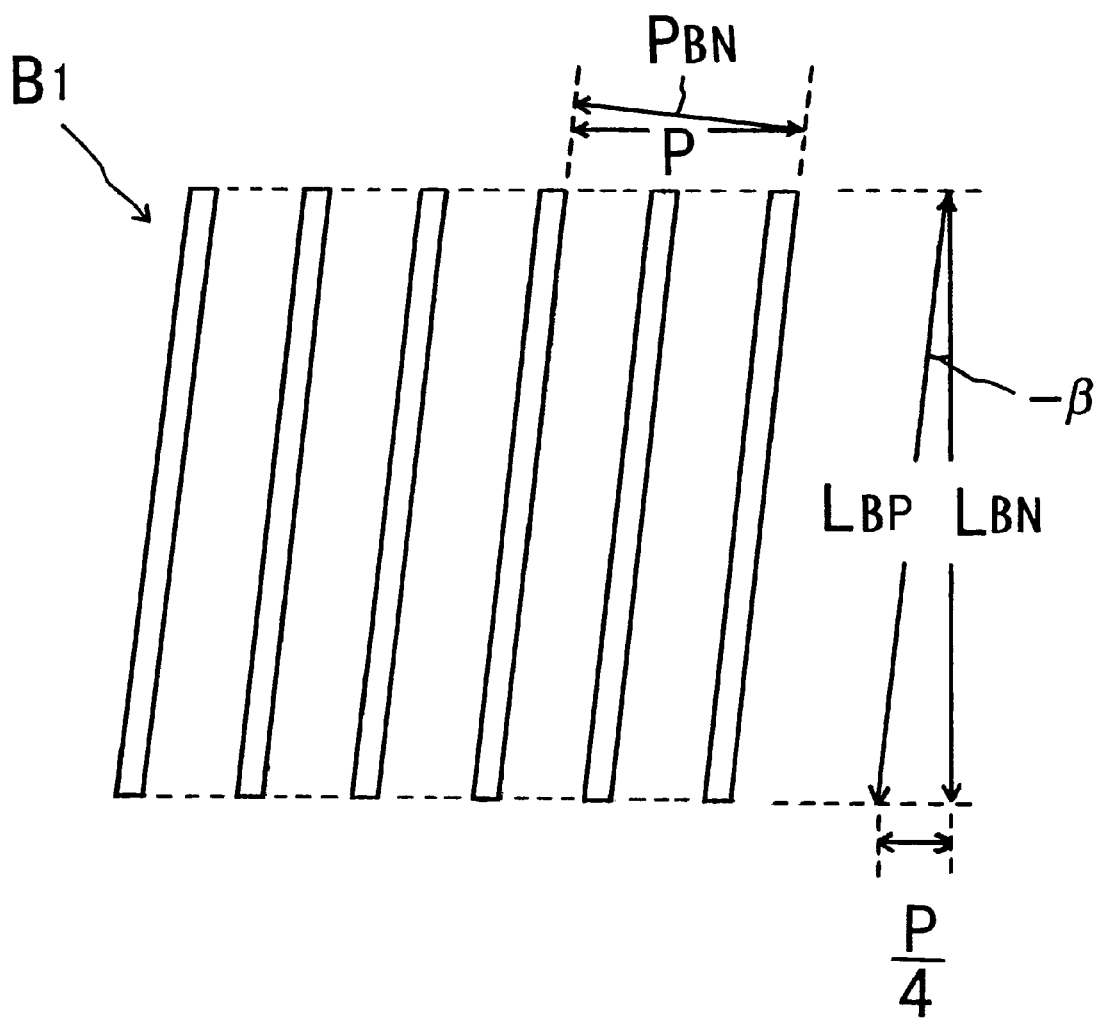
FIG. 17 shows a plan view, on an enlarged scale, of finger-overlap zone $B_1$.

FIG. 17 shows a plan view, on an enlarged scale, of finger-overlap zone $B_1$. The finger direction of finger-overlap zone $B_1$ is slanting to that of finger-overlap zones $A_1$ and $A_2$ by an angle $-\beta$. An interdigital periodicity $P_{BN}$ along the vertical direction to the finger direction of finger-overlap zone $B_1$ is equal to the product of the interdigital periodicity P and cos $\beta$. Finger-overlap zone $B_1$, has a first overlap length $L_{BP}$ along the finger direction thereof and a second overlap length $L_{BN}$ along the finger direction of finger-overlap zones $A_1$ and $A_2$. The overlap length $L_{BP}$ is equal to the product of the overlap length $L_{BN}$ and sec $\beta$. The overlap length $L_{BP}$ is also equal to the product of cosec $\beta$ and the interdigital periodicity P divided by 4, that is, the product of P/4 and cosec $\beta$.

Figure 18:
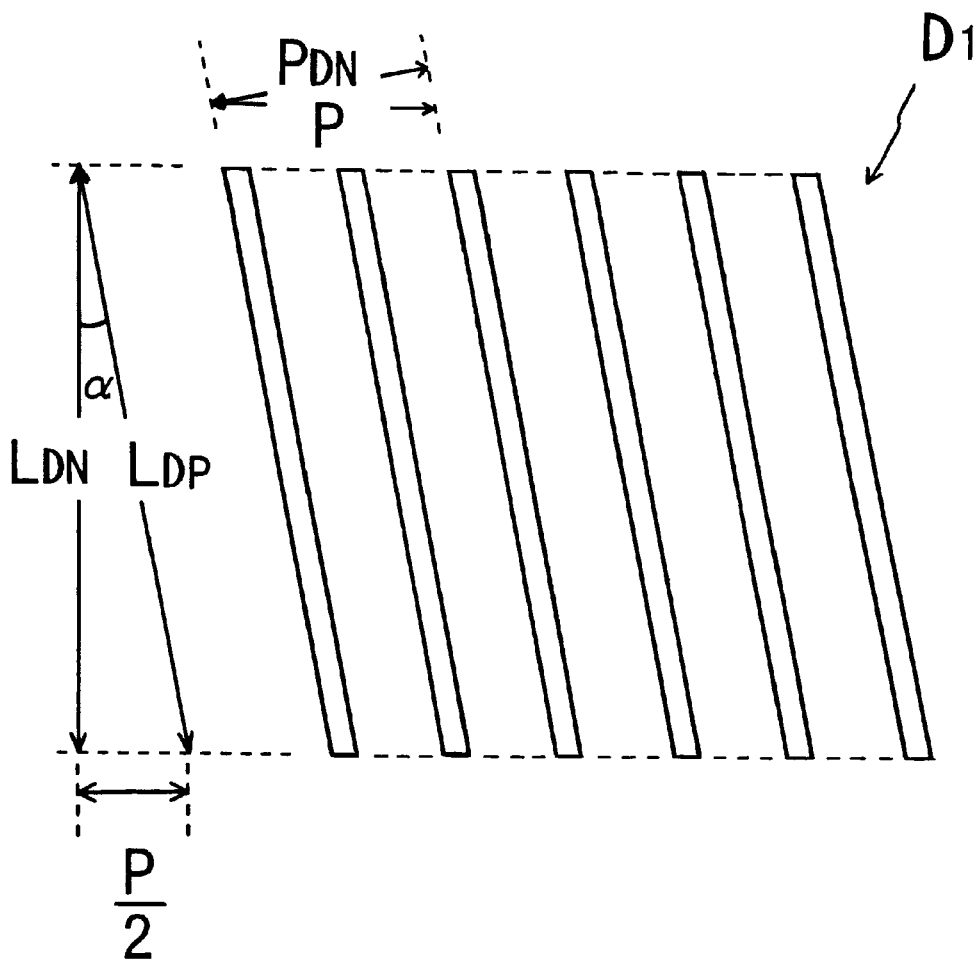
FIG. 18 shows a plan view, on an enlarged scale, of finger-overlap zone $D_1$.

FIG. 18 shows a plan view, on an enlarged scale, of finger-overlap zone $D_1$. Finger-overlap zone $D_2$ has the same construction as finger-overlap zone $D_1$. The finger direction of finger-overlap zones $D_1$ and $D_2$ is slanting to that of finger-overlap zones $C_1$, $C_2$ and $C_3$ by an angle $\alpha$. An interdigital periodicity P1N along the vertical direction to the finger direction of finger-overlap zone $D_1$ is equal to the product of the interdigital periodicity P and cos $\alpha$. Finger-overlap zone $D_1$ has a first overlap length $L_{DP}$ along the finger direction thereof and a second overlap length $L_{DN}$ along the finger direction of finger-overlap zones $C_1$, $C_2$ and $C_3$. The overlap length $L_{DP}$ is equal to the product of the overlap length $L_{DN}$ and sec $\alpha$. The overlap length $L_{DP}$ is also equal to the product of cosec $\alpha$ and the interdigital periodicity P divided by 2, that is, the product of P/2 and cosec $\beta$. The sum of the overlap length (7 mm) of finger-overlap zone $A_1$, the overlap length (7 mm) of finger-overlap zone $A_2$ and the overlap length $L_{BN}$ (1 mm) of finger-overlap zone $B_1$ is equal to the sum of the overlap length (3 mm) of finger-overlap zone $C_1$, the overlap length (3 mm) of finger-overlap zone $C_3$, the overlap length (7 mm) of finger-overlap zone $C_2$, the overlap length $L_{DN}$ (1 mm) of finger-overlap zone $D_1$ and the overlap length $L_{DN}$ (1 mm) of finger-overlap zone $D_2$.

When operating the ultrasonic touch-position sensing device according to the fifth embodiment in FIG. 15, the circuit, in FIG. 5, except for using of input interdigital transducer 13 and output interdigital transducer 14 in place of input interdigital transducer 3 and output interdigital transducer 4, respectively, is available. If an electric signal is applied to input interdigital transducer 13, an elastic wave is excited in the bilayer zone $B_T$. The elastic wave is transmitted to the bilayer zone $B_R$ through the monolayer zone, and transduced to the two electric signals $E_{1a}$ and $E_{2a}$, and two electric signals $E_{1b}$ and $E_{2b}$ at output interdigital transducer 14. In this time, the sum of the electric signals $E_{1a}$ and $E_{1b}$ is zero, and the sum of the electric signals $E_{2a}$ and $E_{2b}$ is zero, because that the overlap length $L_{DP}$ is equal to the product of the overlap length $L_{DN}$ and sec $\alpha$ as well as the product of P/2 and cosec $\beta$. Input interdigital transducer 13 and output interdigital transducer 14 form two ultrasound propagation lanes $Z_{1a}$ and $Z_{2a}$, and two ultrasound propagation lanes $Z_{1b}$ and $Z_{2b}$, in the monolayer zone, ultrasound propagation lane $Z_{1a}$ existing between finger-overlap zones $A_1$ and $C_1$, ultrasound propagation lane $Z_{1b}$ existing between finger-overlap zones $A_1$ and $C_2$, ultrasound propagation lane $Z_{2a}$ existing between finger-overlap zones $A_2$ and $C_2$, ultrasound propagation lane $Z_{2b}$ existing between finger-overlap zones $A_2$ and $C_3$. When touching on position $F_{1a}$, $F_{1b}$, $F_{2a}$ or $F_{2b}$, the electric signal $E_{1b}$, $E_{1a}$, $E_{2b}$ or $E_{2a}$ is delivered at output interdigital transducer 14, respectively, position $F_{1a}$, $F_{1b}$, $F_{2a}$ or $F_{2b}$ corresponding with ultrasound propagation lane $Z_{1a}$, $Z_{1b}$, $Z_{2a}$ or $Z_{2b}$, respectively, the electric signal $E_{1b}$, $E_{1a}$, $E_{2b}$ or $E_{2a}$ having a frequency $f_{1b}$, $f_{1a}$, $f_{2b}$ or $f_{2a}$, respectively. In this time, whether touching on position $F_{1a}$, $F_{1b}$, $F_{2a}$ or $F_{2b}$, or nowhere on the upper- or lower end surface of the monolayer zone, an electric signal transduced by finger-overlap zone $D_1$ and that transduced by finger-overlap zone $D_2$ are not delivered at output interdigital transducer 14. Signal controller 6 senses a touch on position $F_{1a}$, $F_{1b}$, $F_{2a}$ or $F_{2b}$ by detecting the frequency $f_{1b}$, $f_{1a}$, $f_{2b}$ or $f_{2a}$, respectively. The touched position $F_{1a}$, $F_{1b}$, $F_{2a}$ or $F_{2b}$ with respect to ultrasonic transducing unit X and that with respect to ultrasonic transducing unit Y are specified at the same time.

If the ultrasonic touch-position sensing device according to the second embodiment in FIG. 8 has input interdigital transducer 13 and output interdigital transducer 14 in place of input interdigital transducer 3 and output interdigital transducer 4, respectively, the circuit, in FIG. 9, except for using of input interdigital transducer 13 and output interdigital transducer 14 in place of input interdigital transducer 3 and output interdigital transducer 4, respectively, is available. When an electric signal is applied to each input interdigital transducer 13 via switch 7, an elastic wave is excited in the bilayer zone $B_T$. The elastic wave is transmitted to the bilaber zone $B_R$ through the monolayer zone, and transduced to two electric signals $E_{1a}$ and $E_{2a}$, and two electric signals $E_{1b}$ and $E_{2b}$ at each output interdigital transducer 14. When touching on position $F_{1a}$, $F_{1b}$, $F_{2a}$ or $F_{2b}$, the electric signal $E_{1b}$, $E_{1a}$, $E_{2b}$ or $E_{2a}$ is delivered, respectively, at the output point connecting the output terminals of four output interdigilal transducers 14. Signal controller 6 senses a touch on position $F_{1a}$, $F_{1b}$, $F_{2a}$ or $F_{2b}$ by detecting the frequency $f_{1b}$, $f_{1a}$, $f_{2b}$ or $f_{2a}$, respectively, and by finding only one input interdigital transducer 13 supplied with the electric signal via switch 7 just when the electric signal $E_{1b}$, $E_{1a}$, $E_{2b}$ or $E_{2a}$ is detected at the output point connecting the output terminals of four output interdigital transducers 14. The touched position $F_{1a}$, $F_{1b}$, $F_{2a}$ or $F_{2b}$ with respect to ultrasonic transducing unit X and that with respect to ultrasonic transducing unit Y are specified at the same time.

If the ultrasonic touch-position sensing device according to the third embodiment in FIG. 10 has input interdigital transducer 13 and output interdigital transducer 14 in place of input interdigital transducer 3 and output interdigital transducer 4, the circuit, in FIG. 11, except for using of input interdigital transducer 13 and output interdigital transducer 14 in place of input interdigital transducer 3 and output interdigital transducer 4, is available. When an electric signal is applied to each input interdigital transducer 13 via switch 7, an elastic wave is excited in the bilayer zone BT. The elastic wave is transmitted to the bilayer zone $B_R$ through the monolayer zone, and transduced to two electric signals $E_{1a}$ and $E_{2a}$, and two electric signals $E_{1b}$ and $E_{2b}$ at each output interdigital transducer 14, the electric signal $E_{1a}$, $E_{2a}$, $E_{1b}$ or $E_{2b}$ having a phase $\theta_{1a}$, $\theta_{2a}$, $\theta_{1b}$ or $\theta_{2b}$, respectively. When touching on position $F_{1a}$, $F_{1b}$, $F_{2a}$ or $F_{2b}$, the electric signal $E_{1b}$, $E_{1a}$, $E_{2b}$ or $E_{2a}$ is delivered, respectively, at the output point connecting the output terminals of four output interdigital transducers 14. The electric signal $E_{1b}$, $E_{1a}$, $E_{2b}$ or $E_{2a}$ is applied, via amplifier 5, to phase comparator 11 detecting a difference between the phases $\theta_{1b}$ and $\theta_{base}$, ($\theta_{base} - \theta_{1b}$), a difference between the phases $\theta_{1a}$ and $\theta_{base}$, ($\theta_{base} - \theta_{1a}$), a difference between the phases $\theta_{2b}$ and $\theta_{base}$, ($\theta_{base} - \theta_{2b}$), or a difference between the phases $\theta_{2a}$ and $\theta_{base}$, ($\theta_{base} - \theta_{2a}$). Signal controller 6 senses a touch on position $F_{1a}$, $F_{1b}$, $F_{2a}$ or $F_{2b}$ by evaluating the phase difference ($\theta_{base} - \theta_{1b}$), the phase difference ($\theta_{base} - \theta_{1a}$), the phase difference ($\theta_{base} - \theta_{2b}$), or the phase difference ($\theta_{base} - \theta_{2a}$), respectively, and by finding only one input interdigital transducer 13 supplied with the electric signal via switch 7 just when the electric signal $E_{1b}$, $E_{1a}$, $E_{2b}$ or $E_{2a}$ is detected at the output point connecting the output terminals of four output interdigital transducers 14. The touched position $F_{1a}$, $F_{1b}$, $F_{2a}$ or $F_{2b}$ with respect to ultrasonic transducing unit X and that with respect to ultrasonic transducing unit Y are specified at the same time.

Figure 19:
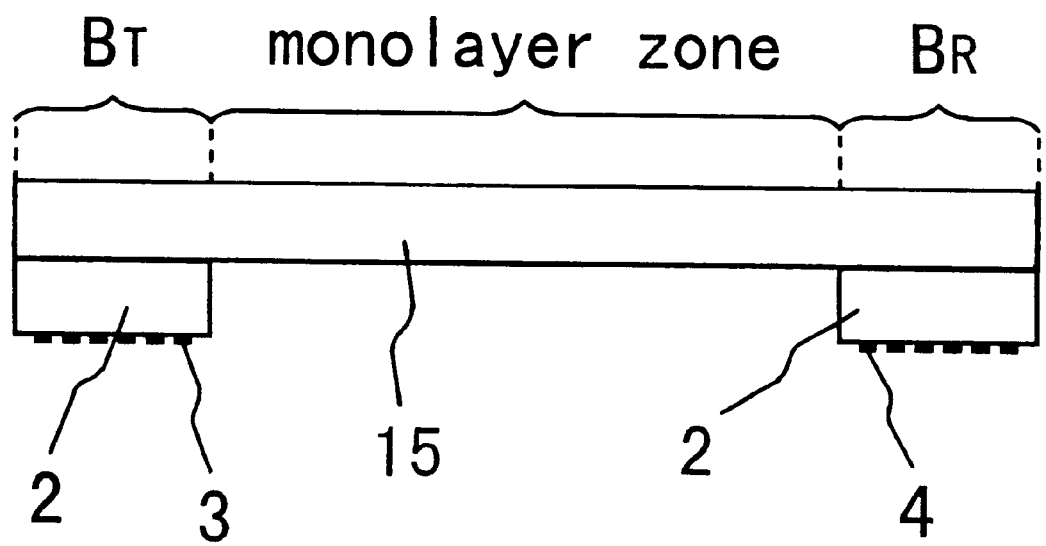
FIG. 19 shows a sectional view of an ultrasonic touch-position sensing device according to a sixth embodiment of the present invention.

FIG. 19 shows a sectional view of an ultrasonic touch-position sensing device according to a sixth embodiment of the present invention. The ultrasonic touch-position sensing device has the same construction as FIG. 1, except for using of nonpiezoelectric plate 15 in place of nonpiezoelectric plate 1. Nonpiezoelectric plate 15 has a dimension of 1 mm in thickness h. Nonpiezoelectric plate 15 and piezoelectric substrate 2 form a bilayer zone $B_T$ and a bilayer zone $B_R$. A remaining part, between the bilayer zones $B_T$ and $B_R$, of nonpiezoelectric plate 15 forms a monolayer zone. FIG. 19 shows only nonpiezoelectric plate 15, piezoelectric substrate 2, and input interdigital transducer 3 and output interdigital transducer 4. The circuit in FIG. 5 is available, when operating the ultrasonic touch-position sensing device of the sixth embodiment, where the thickness d of piezoelectric substrate 2 is smaller than the interdigital periodicity P, and the thickness h of nonpiezoelectric plate 15 is equal to the thickness d. It is possible to increase the transmitting efficiency of the elastic wave from the bilayer zone $B_T$ to the bilayer zone $B_R$ on condition that nonpiezoelectric plate 15 is made of a material such that the phase velocity of the elastic wave traveling on nonpiezoelectric plate 15 alone is equal to that traveling on piezoelectric substrate 2 alone.

In the ultrasonic touch-position sensing device of the sixth embodiment, it is possible to use output interdigital transducer 12 in place of output interdigital transducer 4, and also to use input interdigital transducer 13 and output interdigital transducer 14 in place of input interdigital transducer 3 and output interdigital transducer 4, respectively. In this time, the circuit in FIG. 5 is available.

In the ultrasonic touch-position sensing device of the sixth embodiment, it is possible to use four input interdigital transducers 3 and four output interdigital transducers 4 at the lower end surface of piezoelectric substrate 2, in the same way as FIG. 8. In this arrangement, the circuit in FIG. 9 is available. Moreover, in the arrangement, it is possible to use four output interdigital transducers 12 in place of four output interdigital transducers 4, and also to use four input interdigital transducers 13 and four output interdigital transducers 14 in place of four input interdigital transducers 3 and four output interdigital transducers 4, respectively.

In the ultrasonic touch-position sensing device of the sixth embodiment, it is possible to use reference input interdigital transducer 8, reference output interdigital transducer 9, four input interdigital transducers 3 and four output interdigital transducers 4 at the lower end surface of piezoelectric substrate 2, in the same way as FIG. 10. In this arrangement, the circuit in FIG. 11 is available. Moreover, in the arrangement, it is possible to use four output interdigital transducers 12 in place of four output interdigital transducers 4, and also to use four input interdigital transducers 13 and four output interdigital transducers 14 in place of four input interdigital transducers 3 and four output interdigital transducers 4, respectively.

Figure 20:
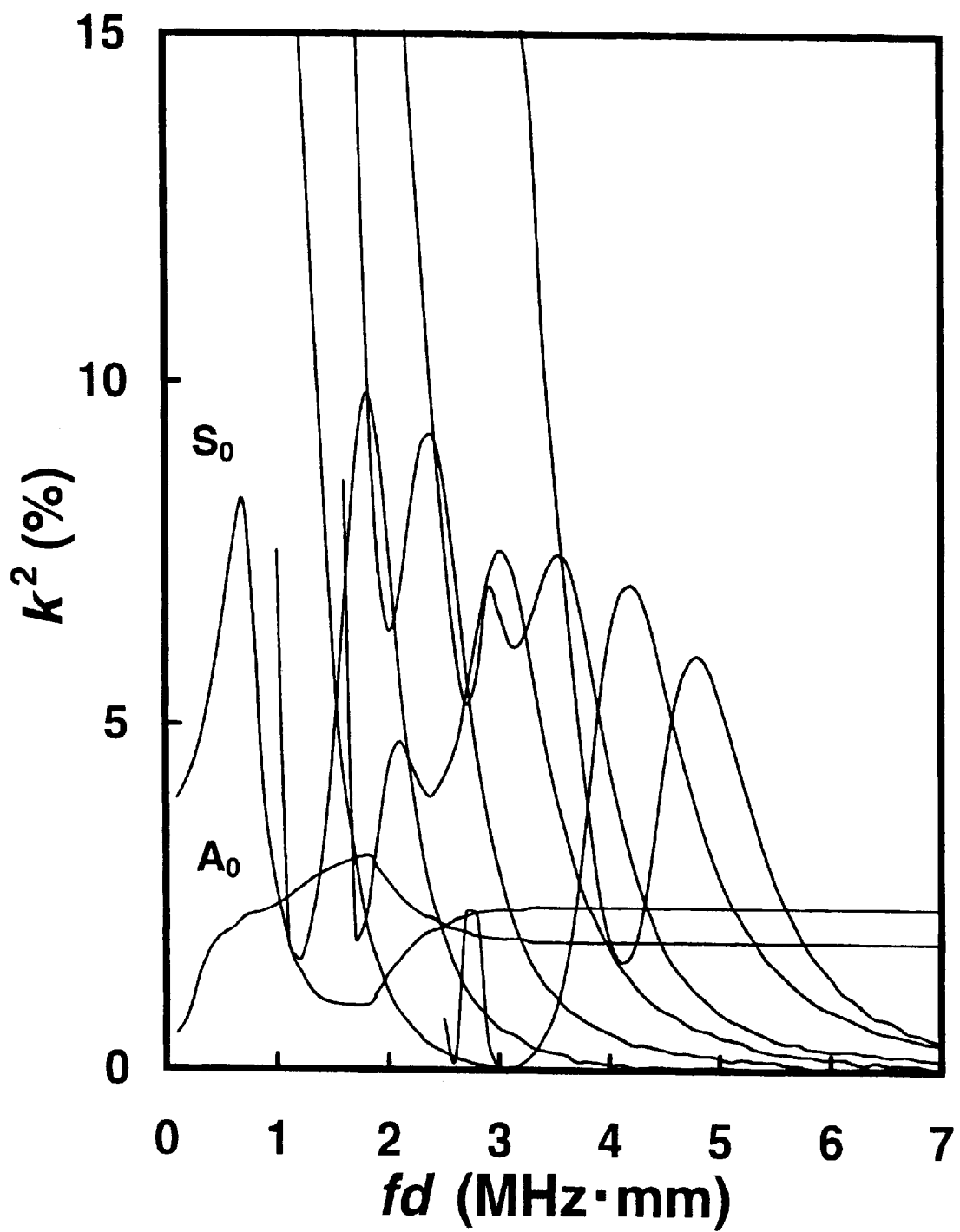
FIG. 20 shows a relationship between the $k^2$ value calculated from the difference between the phase velocity under electrically opened condition and that under electrically shorted condition of piezoelectric substrate 2 of the bilayer zone $B_T$ in FIG. 19, and the fd value.

FIG. 20 shows a relationship between the $k^2$ value calculated from the difference between the phase velocity under electrically opened condition and that under electrically shorted condition of piezoelectric substrate 2 of the bilayer zone $B_T$ in FIG. 19, and the fd value. In FIG. 20, nonpiezoelectric plate 15 is made from a glass having a shear wave velocity of 2297 m/s and a longitudinal wave velocity of 4155 m/s traveling on the glass alone. The velocities of 2297 m/s and 4155 m/s are approximately equal to the velocities of a shear- and a longitudinal waves, 2450 m/s and 4390 m/s, respectively, in piezoelectric substrate 2 alone. The $A_o$ mode elastic wave has the $k^2$ value under 5%. Accordingly, it is clear that the elastic wave of all the modes, except for the $A_o$ mode, that is the elastic wave of the $S_o$ mode and the higher order modes, is excited in the bilayer zone $B_T$ effectively. An electric energy applied to input interdigital transducer 3 is most effectively transduced, for example to the $S_1$ mode elastic wave when the fd value is approximately 1.8 MHz·mm, then the $k^2$ value is approximately 9.5% being the maximum value.

Figure 21:
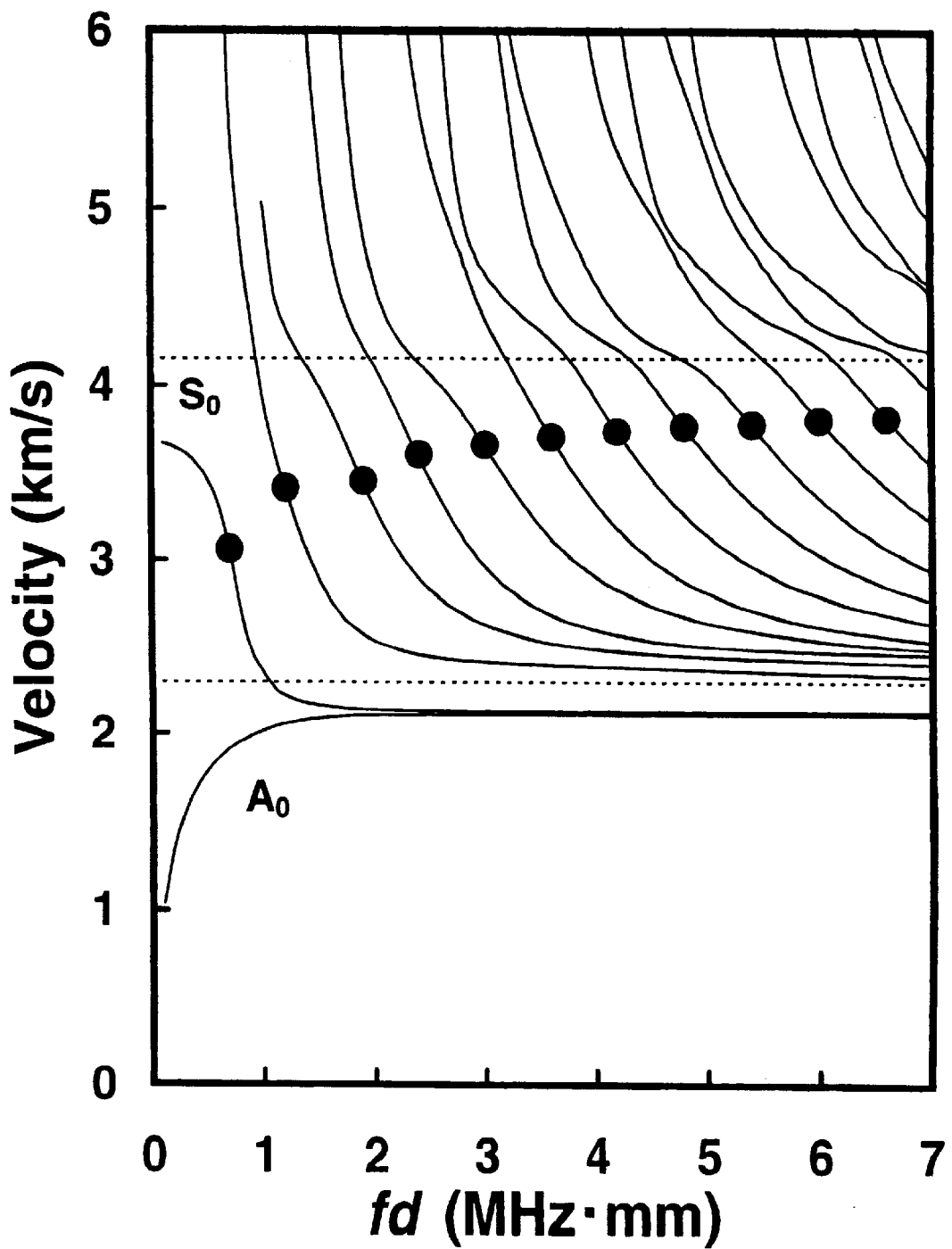
FIG. 21 shows a relationship between the phase velocity of the elastic wave for each mode in the bilayer zone $B_T$ in FIG. 19, and the fd value.

FIG. 21 shows a relationship between the phase velocity of the elastic wave for each mode in the bilayer zone $B_T$ in FIG. 19, and the fd value. In FIG. 21, nonpiezoelectric plate 15 is made from the same glass as FIG. 20. The fd value at each mark ● as the maximum $k^2$ value where an electric energy applied to input interdigital transducer 3 is most effectively transduced to the elastic wave, the maximum $k^2$ value being obtained from FIG. 20. the $V_{fd=o}$ value is approximately 3670 m/s. The phase velocity at each mark ● is approximately equal to the $V_{fd=o}$ value. Thus, the fd value, in which the phase velocity of the elastic wave in the bilayer zone $B_T$ is approximately equal to the $V_{fd=o}$ value, gives the maximum $k^2$ value.

Figure 22:
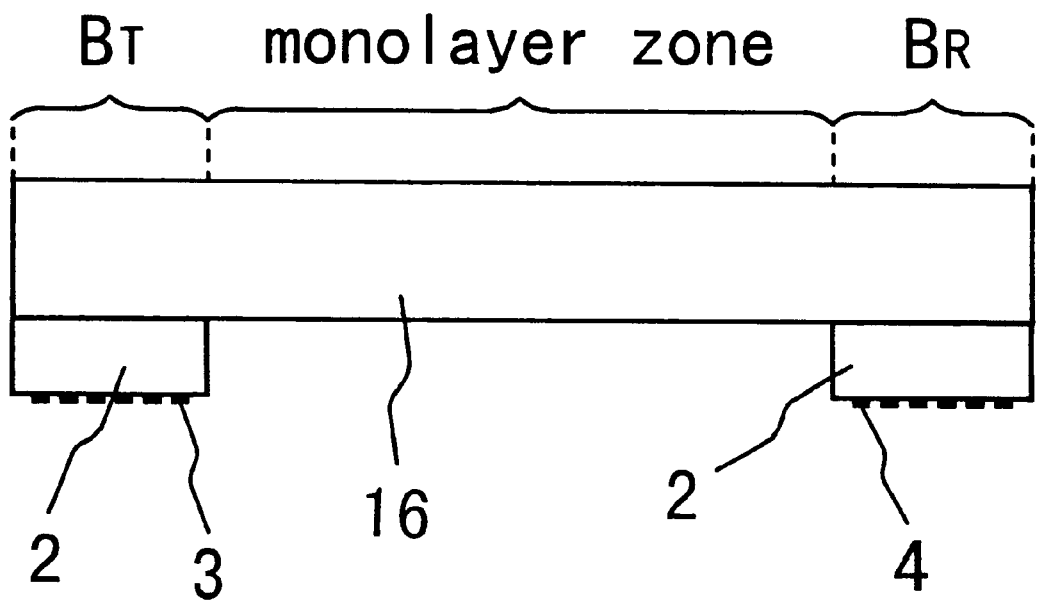
FIG. 22 shows a sectional view of an ultrasonic touch-position sensing device according to a seventh embodiment of the present invention.

FIG. 22 shows a sectional view of an ultrasonic touch-position sensing device according to a seventh embodiment of the present invention. The ultrasonic touch-position sensing device has the same construction as FIG. 1, except for using of nonpiezoelectric plate 16 in place of nonpiezoelectric plate 1. Nonpiezoelectric plate 16 has a dimension of 1.5 mm in thickness h. Nonpiezoelectric plate 16 and piezoelectric substrate 2 form a bilayer zone $B_T$ and a bilayer zone $B_R$. A remaining part, between the bilayer zones $B_T$ and $B_R$, of nonpiezoelectric plate 16 forms a monolayer zone. FIG. 22 shows only nonpiezoelectric plate 16, piezoelectric substrate 2, and input interdigital transducer 3 and output interdigital transducer 4. The circuit in FIG. 5 is available, when operating the ultrasonic touch-position sensing device of the seventh embodiment, where the thickness d of piezoelectric substrate 2 is smaller than the interdigital periodicity P, and the thickness h of nonpiezoelectric plate 16 is larger than the thickness d. It is possible to increase the transmitting efficiency of the elastic wave from the bilayer zone $B_T$ to the bilayer zone $B_R$ on condition that nonpiezoelectric plate 16 is made of a material such that the phase velocity of the elastic wave traveling on nonpiezoelectric plate 16 alone is lower than that traveling on piezoelectric substrate 2 alone.

In the ultrasonic touch-position sensing device of the seventh embodiment, it is possible to use output interdigital transducer 12 in place of output interdigital transducer 4, and also to use input interdigital transducer 13 and output interdigital transducer 14 in place of input interdigital transducer 3 and output interdigital transducer 4, respectively. In this time, the circuit in FIG. 5 is available.

In the ultrasonic touch-position sensing device of the seventh embodiment, it is possible to use four input interdigital transducers 3 and four output interdigital transducers 4 at the lower end surface of piezoelectric substrate 2, in the same way as FIG. 8. In this arrangement, the circuit in FIG. 9 is available. Moreover, in the arrangement, it is possible to use four output interdigital transducers 12 in place of four output interdigital transducers 4, and also to use four input interdigital transducers 13 and four output interdigital transducers 14 in place of four input interdigital transducers 3 and four output interdigital transducers 4, respectively.

In the ultrasonic touch-position sensing device of the seventh embodiment, it is possible to use reference input interdigital transducer 8, reference output interdigital transducer 9, four input interdigital transducers 3 and four output interdigital transducers 4 at the lower end surface of piezoelectric substrate 2, in the same way as FIG. 10. In this arrangement, the circuit in FIG. 11 is available. Moreover, in the arrangement, it is possible to use four output interdigital transducers 12 in place of four output interdigital transducers 4, and also to use four input interdigital transducers 13 and four output interdigital transducers 14 in place of four input interdigital transducers 3 and four output interdigital transducers 4, respectively.

Figure 23:
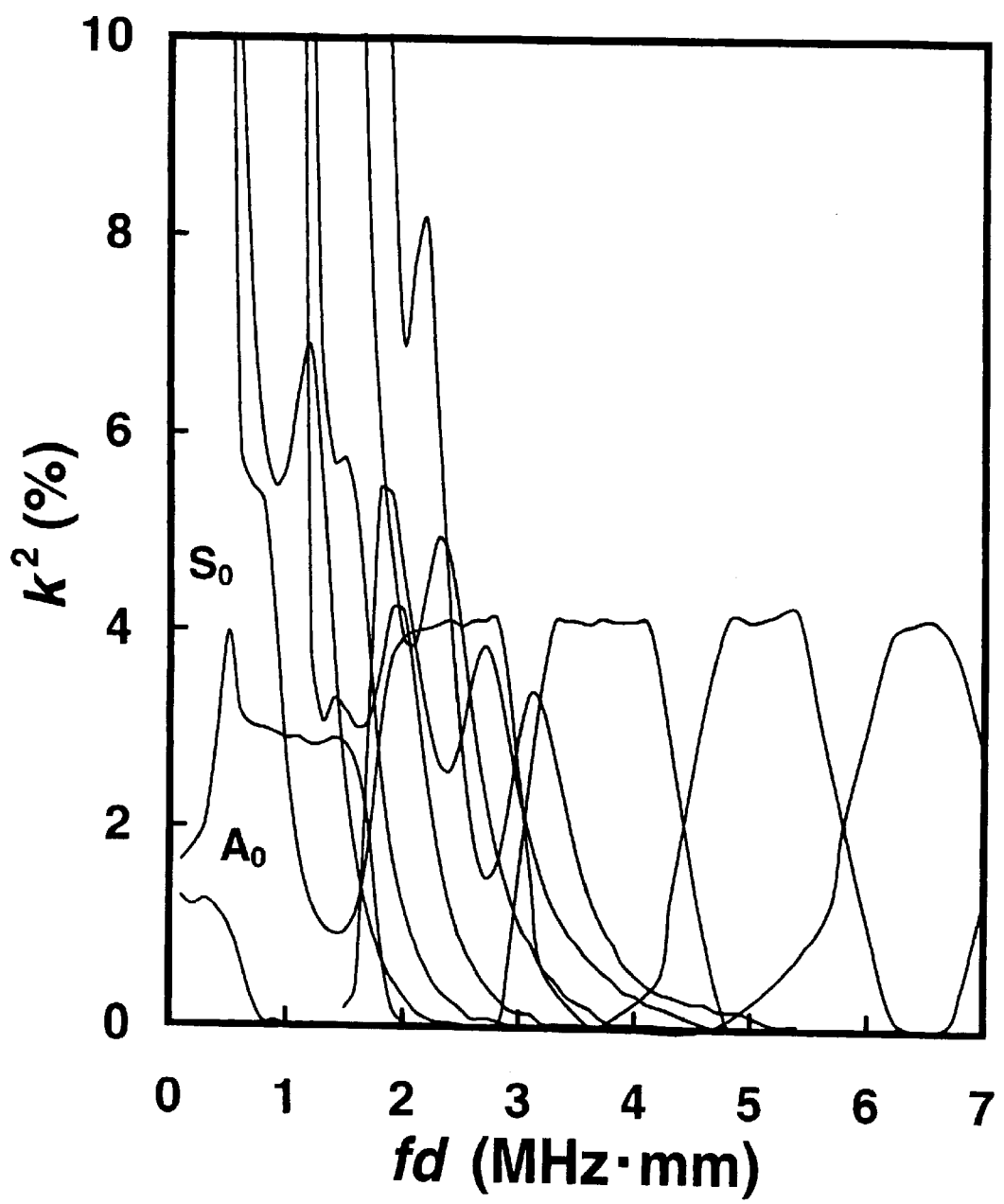
FIG. 23 shows a relationship between the $k^2$ value calculated from the difference between the phase velocity under electrically opened condition and that under electrically shorted condition of piezoelectric substrate 2 of the bilayer zone $B_T$ in FIG. 22, and the fd value.

FIG. 23 shows a relationship between the $k^2$ value calculated from the difference between the phase velocity under electrically opened condition and that under electrically shorted condition of piezoelectric substrate 2 of the bilayer zone $B_T$ in FIG. 22, and the fd value. In FIG. 23, nonpiezoelectric plate 16 is made from a glass having a shear wave velocity of 1988 m/s and a longitudinal wave velocity of 3597 m/s traveling on the glass alone. The velocities of 1988 m/s and 3597 m/s are about 0.8 times the velocities of a shear- and a longitudinal waves, 2450 m/s and 4390 m/s, respectively, in piezoelectric substrate 2 alone. The $A_o$ mode elastic wave has the $k^2$ value under 5%. Accordingly, it is clear that the elastic wave of all the modes, except for the $A_o$ mode, that is the elastic wave of the $S_o$, mode and the higher order modes, is excited in the bilayer zone $B_T$ effectively.

Figure 24:
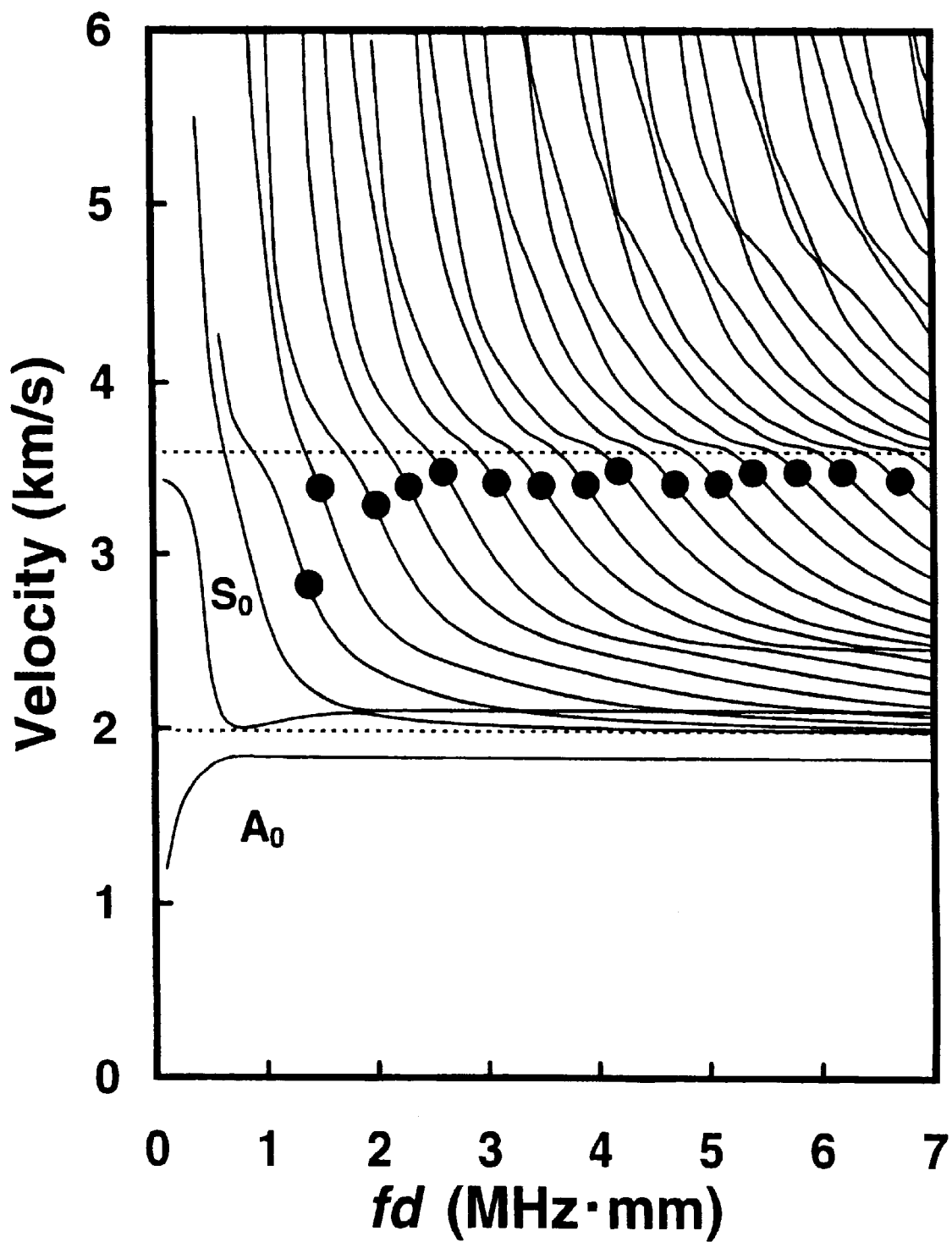
FIG. 24 shows a relationship between the phase velocity of the elastic wave for each mode in the bilayer zone $B_T$ in FIG. 22, and the fd value.

FIG. 24 shows a relationship between the phase velocity of the elastic wave for each mode in the bilayer zone $B_T$ in FIG. 22, and the fd value. In FIG. 24, nonpiezoelectric plate 16 is made from the same glass as FIG. 23. The fd value at each mark ● has the maximum $k^2$ value where an electric energy applied to input interdigital transducer 3 is most effectively transduced to the elastic wave, the maximum $k^2$ value being obtained from FIG. 23. the $V_{fd=o}$ value is approximately 3500 m/s. The phase velocity at each mark ● is approximately equal to the $V_{fd=o}$ value. Thus, the fd value, in which the phase velocity of the elastic wave in the bilayer zone $B_T$ is approximately equal to the $V_{ffd=o}$ value, gives the maximum $k^2$ value.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An ultrasonic touch-position sensing device comprising:
   a nonpiezoelectric plate having an upper- and a lower end surfaces running perpendicular to the direction of the thickness h thereof;

two ultrasonic transducing units mounted on said upper- or lower end surface of said nonpiezoelectric plate; and a signal controller connected with said ultrasonic transducing units, each of said ultrasonic transducing units consisting of a first piezoelectric substrate having an upper- and a lower end surfaces running perpendicular to the direction of the thickness d thereof, a second piezoelectric substrate having an upper- and a lower end surfaces running perpendicular to the direction of the thickness d thereof, at least an input interdigital transducer formed on said upper- or lower end surface of said first piezoelectric substrate and having an interdigital periodicity P and an overlap length L, and at least an output interdigital transducer opposed to said input interdigital transducer and placed on said upper- or lower end surface of said second piezoelectric substrate, said output interdigital transducer having a finger-overlap zone $R_i$ (i=1), or having N finger-overlap zones $R_i$ (i=1, 2, . . . , N) and N−1 finger-overlap zones $Q_i$ {i=1, 2, . . . , (N−1)} between two finger-overlap zones $R_i$ and $R_{(i+1)}$, each finger-overlap zone $R_i$ comprising a first zone $R_{ia}$, a second zone $R_{ib}$, and a third zone $R_{im}$ between said zones $R_{ia}$ and $R_{ib}$, the finger direction of said zones $R_{ia}$ and $R_{ib}$, running parallel with that of said input interdigital transducer, an interdigital periodicity of said zones $R_{ia}$ and $R_{ib}$, being equal to said interdigital periodicity P, the finger direction of said zone $R_{im}$ being slanting to that of said input interdigital transducer by an angle α, an interdigital periodicity $P_{RN}$ along the vertical direction to the finger direction of said zone $R_{im}$ being equal to the product of said interdigital periodicity P and cos α, said zone $R_{im}$ having a first overlap length $L_{RP}$ along the finger direction thereof and a second overlap length $L_{RN}$ along the finger direction of said input interdigital transducer, said overlap length $L_{RP}$ being equal to the product of said overlap length $L_{RN}$ and sec α as well as the product of half said interdigital periodicity P and cosec α, the finger direction of said finger-overlap zone $Q_i$ being slanting to that of said input interdigital transducer by an angle ±β, an interdigital periodicity $P_{QN}$ along the vertical direction to the finger direction of said finger-overlap zone $Q_i$ being equal to the product of said interdigital periodicity P and cos β, said finger-overlap zone $Q_i$ having a first overlap length $L_{QP}$ along the finger direction thereof and a second overlap length $L_{QN}$ along the finger direction of said input interdigital transducer, said overlap length $L_{QP}$ being equal to the product of said overlap length $L_{QN}$ and sec β, a part, adjacent to said first piezoelectric substrate, of said nonpiezoelectric plate, and said first piezoelectric substrate forming a bilayer zone $B_T$, a part, adjacent to said second piezoelectric substrate, of said nonpiezoelectric plate, and said second piezoelectric substrate forming a bilayer zone $B_R$, a remaining part, between said bilayer zones $B_T$ and $B_R$, of said nonpiezoelectric plate forming a monolayer zone, said input interdigital transducer receiving an electric signal with a frequency approximately corresponding to said interdigital periodicity P, exciting an elastic wave of the $S_o$ mode and the higher order modes in said bilayer zone $B_T$, and transmitting said elastic wave, having the wavelength approximately equal to said interdigital periodicity P, to said bilayer zone $B_R$ through said monolayer zone, said zones $R_{ia}$ and $R_{ib}$ transducing said elastic wave to electric signals $E_{ia}$ and $E_{ib}$ (i=1, 2, . . . , N), respectively, the sum of said electric signals $E_{ia}$ and $E_{ib}$ being zero, said input- and output interdigital transducers forming N pairs of ultrasound propagation lanes $Z_{ia}$ and $Z_{ib}$ (i=1, 2, . . . , N), in said monolayer zone, corresponding to said zones $R_{ia}$ and $R_{ib}$, respectively, said ultrasound propagation lanes $Z_{ia}$ and $Z_{ib}$ corresponding to positions $F_{ia}$ and $F_{ib}$ (i=1, 2, . . . , N) on an upper- or a lower end surface of said monolayer zone, respectively, said output interdigital transducer delivering an electric signal $E_{xb}$ corresponding to an ultrasound propagation lane $Z_{xb}$ only when an elastic wave on an ultrasound propagation lane $Z_{xa}$ attenuates by touching with a finger or others on a position $F_{xa}$, or delivering an electric signal $E_{xa}$ corresponding to said ultrasound propagation lane $Z_{xa}$ only when an elastic wave on said ultrasound propagation lane $Z_{xb}$ attenuates by touching on a position $F_{xb}$, said positions $F_{xa}$ and $F_{xb}$ making a pair, said signal controller sensing a touch on said position $F_{xa}$ by detecting said electric signal $E_{xb}$, or a touch on said position $F_{xb}$ by detecting said electric signal $E_{xa}$.

2. An ultrasonic touch-position sensing device in claim 1, wherein said overlap length $L_{QP}$ is equal to the product of cosec β and said interdigital periodicity P divided by twice the number N of said finger-overlap zones $R_i$.

3. An ultrasonic touch-position sensing device in claim 1, wherein each of said ultrasonic transducing units further comprises an amplifier, an output terminal of said output interdigital transducer being connected with an input terminal of said input interdigital transducer and an input terminal of said signal controller, via said amplifier, said electric signals $E_{ia}$ and $E_{ib}$ having frequencies $f_{ia}$ and $f_{ib}$, respectively, said signal controller sensing a touch on said position $F_{xa}$ by detecting a frequency $f_{xb}$ of said electric signal $E_{xb}$, or a touch on said position $F_{xb}$ by detecting a frequency $f_{xa}$ of said electric signal $E_{xa}$.

4. An ultrasonic touch-position sensing device in claim 1, wherein each of said ultrasonic transducing units further comprising a reference input interdigital transducer formed on said upper- or lower end surface of said first piezoelectric substrate, a reference output interdigital transducer formed on said upper- or lower end surface of said second piezoelectric substrate, an amplifier, and a phase comparator, the finger direction of said reference input interdigital transducer being parallel to that of said reference output interdigital transducer, an output terminal of said reference output interdigital transducer being connected not only with input terminals of said input interdigital transducer and said reference input interdigital transducer, but also with an input terminal of said phase comparator, via said amplifier, an output terminal of said output interdigital transducer being connected with an input terminal of said signal controller via said phase comparator, said reference input interdigital transducer receiving an electric signal, exciting an elastic wave in said bilayer zone $B_T$, and transmitting said elastic wave to said bilayer zone $B_R$ through said monolayer zone, said reference output interdigital transducer transducing said elastic wave to an electric signal with a phase $\theta_{base}$, and delivering said electric signal, said electric signals $E_{ia}$ and $E_{ib}$ having phases $\theta_{ia}$ and $\theta_{ib}$, respectively, said phase comparator detecting a difference between said phases $\theta_{base}$ and $\theta_{ia}$, or a difference between said phases $\theta_{base}$ and $\theta_{ib}$, said signal controller sensing a touch on said position $F_{xa}$, by evaluating a difference between said phase $\theta_{base}$ and a phase $\theta_{xb}$ of said electric signal $E_{xb}$, or a touch on said position $F_{xb}$ by evaluating a difference between said phase $\theta_{base}$ and a phase $\theta_{xa}$ of said electric signal $E_{xa}$.

5. An ultrasonic switching device as defined in claim 1, wherein said thickness h is smaller than said thickness d, said thickness d being smaller than said interdigital periodicity P, said nonpiezoelectric plate being made of a material such that the phase velocity of the elastic wave traveling on said nonpiezoelectric plate alone is higher than that traveling on said first- and second piezoelectric substrates alone, the phase velocity of said elastic wave excited in said bilayer zone $B_T$ being approximately equal to the phase velocity $V_{fd=o}$, of the $S_o$ mode elastic wave, corresponding to a condition that the product fd of the frequency f of said elastic wave and said thickness d is approximated to be zero.

6. An ultrasonic switching device as defined in claim 1, wherein said thickness h is approximately equal to said thickness d, said thickness d being smaller than said interdigital periodicity P, said nonpiezoelectric plate being made of a material such that the phase velocity of the elastic wave traveling on said nonpiezoelectric plate alone is approximately equal to that traveling on said first- and second piezoelectric substrates alone, the phase velocity of said elastic wave excited in said bilayer zone $B_T$ being approximately equal to the phase velocity $V_{fd=o}$, of the $S_o$ mode elastic wave, corresponding to a condition that the product fd of the frequency f of said elastic wave and said thickness d is approximated to be zero.

7. An ultrasonic switching device as defined in claim 1, wherein said thickness h is larger than said thickness d, said thickness d being smaller than said interdigital periodicity P, said nonpiezoelectric plate being made of a material such that the phase velocity of the elastic wave traveling on said nonpiezoelectric plate alone is lower than that traveling on said first- and second piezoelectric substrates alone, the phase velocity of said elastic wave excited in said bilayer zone $B_T$ being approximately equal to the phase velocity $V_{fd=o}$, of the $S_o$ mode elastic wave, corresponding to a condition that the product fd of the frequency f of said elastic wave and said thickness d is approximated to be zero.

8. An ultrasonic touch--position sensing device in claim 1, wherein said first- and second piezoelectric substrates are made of a piezoelectric ceramic, respectively, the polarization axis thereof being parallel to the direction of said thickness d.

9. An ultrasonic touch-position sensing device in claim 1, wherein said ultrasound propagation lanes $Z_{ia}$ and $Z_{ib}$, of one of said ultrasonic transducing units, are vertical to said ultrasound propagation lanes $Z_{ia}$ and $Z_{ib}$, of the other of said ultrasonic transducing units.

10. An ultrasonic touch-position sensing device in claim 1, wherein a beginning end- and a terminal end portions of said first piezoelectric substrate of one of said ultrasonic transducing units are linked with each terminal end portion of said first- and second piezoelectric substrates of the other of said ultrasonic transducing units, and those of said second piezoelectric substrate of said one of said ultrasonic transducing units are linked with each beginnings end portion of said first- and second piezoelectric substrates of said other of said ultrasonic transducing units, all said first- and second piezoelectric substrates of said ultrasonic transducing units forming a common piezoelectric substrate with a frame-like structure.

11. An ultrasonic touch-position sensing device comprising:

a nonpiezoelectric plate having an upper- and a lower end surfaces running perpendicular to the direction of the thickness h thereof;

two ultrasonic transducing units mounted on said upper- or lower end surface of said nonpiezoelectric plate; and a signal controller connected with said ultrasonic transducing units, each of said ultrasonic transducing units consisting of a first piezoelectric substrate having an upper- and a lower end surfaces running perpendicular to the direction of the thickness d thereof, a second piezoelectric substrate having an upper- and a lower end surfaces running perpendicular to the direction of the thickness d thereof, an input interdigital transducer formed on one end surface of said first piezoelectric substrate and having N finger-overlap zones $A_i$ (i=1, 2, . . . , N) and N−1 finger-overlap zones $B_i$ {i=1, 2, . . . , (N−1)} between two finger-overlap zones $A_i$ and $A_{(i+1)}$, and an output interdigital transducer formed on one end surface of said second piezoelectric substrate and having N+1 finger-overlap zones $C_i$ {i=1, 2, . . . , (N+1)} and N finger-overlap zones $D_i$ (i=1, 2, . . . , N) between two finger-overlap zones $C_i$ and $C_{(i+1)}$, the finger direction of said finger-overlap zones $A_i$ running parallel with that of said finger-overlap zones $C_i$, the finger direction of said finger-overlap zones $B_i$ being slanting to that of said finger-overlap zones $A_i$ by an angle -β, an interdigital periodicity PRN along the vertical direction to the finger direction of said finger-overlap zones $B_i$ being equal to the product of cos β and an interdigital periodicity P of said finger-overlap zones $A_i$ and $C_i$, each finger-overlap zone $B_i$ having a first overlap length $L_{BP}$ along the finger direction thereof and a second overlap length $L_{BN}$ along the finger direction of said finger-overlap zones $A_i$, said overlap length $L_{BP}$ being equal to the product of sec β and said overlap length $L_{BN}$, the finger direction of said finger-overlap zones $D_i$ being slanting to that of said finger-overlap zones $C_i$ by an angle α, an interdigital periodicity $P_{DN}$ along the vertical direction to the finger direction of said finger-overlap zones $D_i$ being equal to the product of cos α and said interdigital periodicity P, each finger-overlap zone $D_i$ having a first overlap length $L_{DP}$ along the finger direction thereof and a second overlap length $L_{DN}$ along the finger direction of said finger-overlap zones $C_i$, said overlap length $L_{DP}$ being equal to the product of sec α and said overlap length $L_{DN}$ as well as the product of half said interdigital periodicity P and cosec α, a part, adjacent to said first piezoelectric substrate, of said nonpiezoelectric plate, and said first piezoelectric substrate forming a bilayer zone $B_T$, a part, adjacent to said second piezoelectric substrate, of said nonpiezoelectric plate, and said second piezoelectric substrate forming a bilayer zone $B_R$, a remaining part, between said bilayer zones $B_T$ and $B_R$, of said nonpiezoelectric plate forming a monolayer zone, said input interdigital transducer receiving an electric signal with a frequency approximately corresponding to said interdigital periodicity P, exciting an elastic wave of the $S_o$ mode and the higher order modes in said bilayer zone $B_T$, and transmitting said elastic wave, having the wavelength approximately equal to said interdigital periodicity P, to said bilayer zone $B_R$ through said monolayer zone, said output interdigital transducer transducing said ultrasound to N electric signals $E_{ia}$ (i=1, 2, ..., N) and N electric signals $E_{ib}$ (i=1, 2, ..., N), respectively, the sum of said electric signals $E_{ia}$ and $E_{ib}$ being zero, said input- and output interdigital transducers forming N pairs of ultrasound propagation lanes $Z_{ia}$ and $Z_{ib}$ (i=1, 2, ..., N) in said monolayer zone, an ultrasound propagation lane $Z_{ia}$ existing between said finger-overlap zones $A_i$ and $C_i$, an ultrasound propagation lane $Z_{ib}$ existing between finger-overlap zones $A_i$ and $C_{(i+1)}$, said ultrasound propagation lanes $Z_{ia}$ and $Z_{ib}$ corresponding to positions $F_{ia}$ and $F_{ib}$ (i=1, 2, ..., N) on an upper- or lower end surface of said monolayer zone, respectively, said output interdigital transducer delivering an electric signal $E_{xb}$ corresponding to an ultrasound propagation lane $Z_{xb}$ only when an elastic wave on an ultrasound propagation lane $Z_{xa}$ attenuates by touching with a finger or others on a position $F_{xa}$, or delivering an electric signal $E_{xa}$ corresponding to said ultrasound propagation lane $Z_{xa}$ only when an elastic wave on said ultrasound propagation lane $Z_{xb}$ attenuates by touching on a position $F_{xb}$, said positions $F_{xa}$ and $F_{xb}$ making a pair, said signal controller sensing a touch on said position $F_{xa}$ by detecting said electric signal $E_{xb}$, or a touch on said position $F_{xb}$ by detecting said electric signal $E_{xa}$.

12. An ultrasonic touch-position sensing device in claim 11, wherein said overlap length Lnp is equal to the product of cosec β and said interdigital periodicity P divided by twice the number N of said finger-overlap zones $A_i$.

13. An ultrasonic touch-position sensing device in claim 11, wherein each of said ultrasonic transducing units further comprises an amplifier, an output terminal of said output interdigital transducer being connected with an input terminal of said input interdigital transducer and an input terminal of said signal controller, via said amplifier, said electric signals $E_{ia}$ and $E_{ib}$ having frequencies $f_{ia}$ and $f_{ib}$, respectively, said signal controller sensing a touch on said position $F_{xa}$ by detecting a frequency $f_{xb}$ of said electric signal $E_{xb}$, or a touch on said position $F_{xb}$ by detecting a frequency $f_{xa}$ of said electric signal $E_{xa}$.

14. An ultrasonic touch-position sensing device in claim 11, wherein each of said ultrasonic transducing units further comprising a reference input interdigital transducer formed on said upper- or lower end surface of said first piezoelectric substrate, a reference output interdigital transducer formed on said upper- or lower end surface of said second piezoelectric substrate, an amplifier, and a phase comparator, the finger direction of said reference input interdigital transducer being parallel to that of said reference output interdigital transducer, an output terminal of M,aid reference output interdigital transducer being connected not only with input terminals of said input interdigital transducer and said reference input interdigital transducer, but also with an input terminal of said phase comparator, via said amplifier, an output terminal of said output interdigital transducer being connected with an input terminal of said signal controller via said phase comparator, said reference input interdigital transducer receiving an electric signal, exciting an elastic wave in said bilayer zone $B_T$, and transmitting said elastic wave to said bilayer zone Bn through said monolayer zone, said reference output interdigital transducer transducing said elastic wave to an electric signal with a phase $θ_{base}$, and delivering said electric signal, said electric signals $E_{ia}$ and $E_{ib}$ having phases $θ_{ia}$ and $θ_{ib}$, respectively, said phase comparator detecting a difference between said phases $θ_{base}$ and $θ_{ia}$, or a difference between said phases $θ_{base}$ and $θ_{ib}$, said signal controller sensing a touch on said position $F_{xa}$ by evaluating a difference between said phase $θ_{base}$ and a phase $θ_{xb}$ of said electric signal $E_{xb}$, or a touch on said position $F_{xb}$ by evaluating a difference between said phase $θ_{base}$ and a phase $θ_{xa}$ of said electric signal $E_{xa}$.

15. An ultrasonic switching device as defined in claim 11, wherein said thickness h is smaller than said thickness d, said thickness d being smaller than said interdigital periodicity P, said nonpiezoelectric plate being made of a material such that the phase velocity of the elastic wave traveling on said nonpiezoelectric plate alone is higher than that traveling on said first- and second piezoelectric substrates alone, the phase velocity of said elastic wave excited in said bilayer zone $B_T$ being approximately equal to the phase velocity $V_{fd=o}$ of the $S_o$ mode elastic wave, corresponding to a condition that the product fd of the frequency f of said elastic wave and said thickness d is approximated to be zero.

16. An ultrasonic switching device as defined in claim 11, wherein said thickness h is approximately equal to said thickness d, said thickness d being smaller than said interdigital periodicity P, said nonpiezoelectric plate being made of a material such that the phase velocity of the elastic wave traveling on said nonpiezoelectric plate alone is approximately equal to that traveling on said first- and second piezoelectric substrates alone, the phase velocity of said elastic wave excited in said bilayer zone $B_T$ being approximately equal to the phase velocity $V_{fd=o}$, of the $S_o$ mode elastic wave, corresponding to a condition that the product fd of the frequency f of said elastic wave and said thickness d is approximated to be zero.

17. An ultrasonic switching device as defined in claim 11, wherein said thickness h is larger than said thickness d, said thickness d being smaller than said interdigital periodicity P, said nonpiezoelectric plate being made of a material such that the phase velocity of the elastic wave traveling on said nonpiezoelectric plate alone is lower than that traveling on said first- and second piezoelectric substrates alone, the phase velocity of said elastic wave excited in said bilayer zone $B_T$ being approximately equal to the phase velocity $V_{fd=o}$, of the $S_o$ mode elastic wave, corresponding to a condition that the product fd of the frequency f of said elastic wave and said thickness d is approximated to be zero.

18. An ultrasonic touch-position sensing device in claim 11, wherein said first- and second piezoelectric substrates are made of a piezoelectric ceramic, respectively, the polarization axis thereof being parallel to the direction of said thickness d.

19. An ultrasonic touch-position sensing device in claim 11, wherein said ultrasound propagation lanes $Z_{ia}$ and $Z_{ib}$, of one of said ultrasonic transducing units, are vertical to said ultrasound propagation lanes $Z_{ia}$ and $Z_{ib}$, of the other of said ultrasonic transducing units.

20. An ultrasonic touch-position sensing device in claim 11, wherein a beginning end- and a terminal end portions of said first piezoelectric substrate of one of said ultrasonic transducing units are linked with each terminal end portion of said first- and second piezoelectric substrates of the other of said ultrasonic transducing units, and those of said second piezoelectric substrate of said one of said ultrasonic transducing units are linked with each beginning end portion of said first- and second piezoelectric substrates of said other of said ultrasonic transducing units, all said first- and second piezoelectric substrates of said ultrasonic transducing units forming a common piezoelectric substrate with a frame-like structure.

* * * * *